US012721267B2

(12) United States Patent
Mizuhata

(10) Patent No.: US 12,721,267 B2
(45) Date of Patent: Sep. 1, 2026

(54) ARRANGEMENT OF A COOLING DEVICE OF A COMBINE

(71) Applicant: Yanmar Holdings Co., Ltd., Osaka (JP)

(72) Inventor: Tatsuya Mizuhata, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 522 days.

(21) Appl. No.: 18/210,988

(22) Filed: Jun. 16, 2023

(65) Prior Publication Data

US 2023/0403975 A1 Dec. 21, 2023

(30) Foreign Application Priority Data

Jun. 17, 2022 (JP) ................................ 2022-098155

(51) Int. Cl.
*A01D 41/127* (2006.01)

(52) U.S. Cl.
CPC ................................ *A01D 41/1274* (2013.01)

(58) Field of Classification Search
CPC .... A01D 41/1274; A01D 41/12; A01D 41/00; B60K 11/04; B60Y 2200/222; F01P 3/18; F01P 3/20; F01P 5/02; F01P 2060/02; F02B 3201/0431
USPC ................ 123/196 AB, 41.49, 41.64, 41.31; 165/122, 299, 916, 51, 41
See application file for complete search history.

(56) References Cited

U.S. PATENT DOCUMENTS

| | | | | |
|---|---|---|---|---|
| 1,459,247 | A * | 6/1923 | Vilar Y Pazos | A01D 45/10 56/13.9 |
| 7,997,238 | B2 * | 8/2011 | D'hondt | F01P 11/12 123/41.31 |
| 9,004,210 | B2 * | 4/2015 | Kim | B60K 13/02 180/68.3 |
| 10,214,247 | B2 * | 2/2019 | Watabe | B62D 25/12 |
| 10,479,191 | B2 * | 11/2019 | Ivey | B60K 11/04 |
| 2018/0304936 | A1 | 10/2018 | Watabe et al. | |

FOREIGN PATENT DOCUMENTS

| | | | | |
|---|---|---|---|---|
| CN | 102398510 | A * | 4/2012 | |
| CN | 205297728 | U * | 6/2016 | |
| CN | 106535615 | A * | 3/2017 | F01N 13/08 |
| CN | 108135130 | A | 6/2018 | |
| EP | 1306637 | A1 * | 5/2003 | F28D 1/0443 |
| EP | 1880752 | A1 * | 1/2008 | B01D 46/0056 |
| ES | 382974 | A1 * | 12/1972 | B60K 11/085 |
| JP | S6224016 | U * | 2/1987 | |
| JP | H02114520 | U * | 9/1990 | |
| JP | 2006254798 | A * | 9/2006 | |

(Continued)

OTHER PUBLICATIONS

The Extended European Search Report dated Nov. 2, 2023 issued in EP Application No. 23176929.0.

*Primary Examiner* — Joseph M Rocca
*Assistant Examiner* — Sunny D Webb
(74) *Attorney, Agent, or Firm* — NORTON ROSE FULBRIGHT US LLP

(57) ABSTRACT

A combine is a combine in which an engine is arranged at a front portion of a traveling machine body. The combine includes a cooling device that cools the engine, and an electric controller that controls operation of the combine is arranged on one side surface of the cooling device.

8 Claims, 16 Drawing Sheets

(56) References Cited

FOREIGN PATENT DOCUMENTS

| | | | | | |
|---|---|---|---|---|---|
| JP | 2011073539 | A | * | 4/2011 | |
| JP | 2020036626 | A | | 3/2020 | |
| JP | 2020066358 | A | * | 4/2020 | |
| JP | 6979450 | B2 | | 12/2021 | |
| KR | 20130013313 | A | * | 2/2013 | ......... A01D 41/1208 |
| KR | 20140014478 | A | * | 2/2014 | ........... A01D 41/127 |

* cited by examiner 1
2
3
3a
3b
3c
4
5
5a
5b
5c
5e
5f
6
6a
7
8
8a
9
9a
9b
10
10a
10b
12
25
27
30
32
33
35
330
562

1
2
3
3a
3b
3c
4
5
5a
5b
5c
5e
5f
7
7a
9
9a
9b
12
14
15
16
24
25
30
34
35
140
200
500
503
540
562

ARRANGEMENT OF A COOLING DEVICE OF A COMBINE

CROSS-REFERENCE TO RELATED APPLICATIONS

This application claims priority under 35 U.S.C. § 119 to JP Application No. 2022-098155 filed Jun. 17, 2022 the entire contents of which are hereby incorporated by reference.

TECHNICAL FIELD

The present invention relates to a combine including an electric controller arranged so as to be less susceptible to dust from the outside or exhaust air from an engine.

BACKGROUND ART

Some combines include, for example, an electric controller such as an ECU for controlling operation of an engine, and the electric controller is arranged away from influence of heat from the engine.

Patent Document 1 discloses a combine equipped with an engine below and behind a steering unit, the combine including a support frame provided on the lower front side of the steering unit and a shielding member provided on the front side of the support frame to shield the combine in the front-rear direction and an electric controller being attached to the further front side of the shielding member.

According to the combine having such an electric controller arrangement structure, heat generated from the engine is less likely to be transmitted to the electric controller, and the risk of thermal damage of the electric controller can be reduced.

However, since the electric controller is provided on the front side of the shielding member, the electric controller is inevitably arranged in the vicinity of a reaping unit, and as a result, there is a possibility that the electric controller is susceptible to dust.

That is, dust caused by reaping by the reaping unit at the time of harvesting is likely to adhere to and accumulate on a connection portion such as a coupler at a wire end portion for connecting the electric controller and the engine to each other, and there is a possibility that the dust inadvertently enters the connection portion at the time of attachment or detachment of the connection portion and causes an electric trouble in the electric controller.

PRIOR ART DOCUMENT

Patent Document

Patent Document 1: Japanese Patent No. 6979450

SUMMARY OF INVENTION

Technical Problem

An object of the present invention is to provide a combine in which an electric controller is arranged at a location where the electric controller is less susceptible to heat generated from an engine and dust and the like are less likely to be accumulated.

Solution to Problem

A combine according to the present invention is a combine in which an engine is arranged at a front portion of a traveling machine body, the combine including a cooling device that cools the engine. An electric controller that controls operation of the combine is arranged on one side surface of the cooling device.

In the combine according to another aspect of the present invention, the cooling device is arranged at a side end portion of the traveling machine body, the engine is arranged on one side of the cooling device in the front-rear direction of the traveling machine body, and the electric controller is arranged on a side surface of the cooling device opposite to the one side.

In the combine according to still another aspect of the present invention, the cooling device includes a plurality of cooling devices arranged in an up-down direction on the traveling machine body, the electric controller is arranged on an upper one of the plurality of cooling devices, and the upper cooling device includes a cooling fan, and cools air supplied to the engine.

The combine according to still another aspect of the present invention further includes a grain tank on the traveling machine body, and the electric controller is arranged between the cooling device and the grain tank.

In the combine according to still another aspect of the present invention, the electric controller is a controller that controls the engine.

In the combine according to still another aspect of the present invention, the electric controller includes a coupler to which an end portion of a harness is connected, and the coupler has an insertion port facing the inside of the traveling machine body in the width direction thereof.

In the combine according to still another aspect of the present invention, the cooling device is coupled to and supported by a support frame standing on the traveling machine body.

Advantageous Effects of Invention

According to the present invention, the electric controller that controls operation of the combine is arranged at the location where the electric controller is less susceptible to heat generated from the engine and dust and the like are less likely to be accumulated, so that occurrence of a trouble in the controller can be prevented.

DESCRIPTION OF EMBODIMENTS

The present invention is intended to stabilize, in a combine in which an engine is arranged at a front portion of a traveling machine body, a function of controlling the combine by an electric controller that controls operation of the combine by devising the layout of the electric controller so as to keep the electric controller away from influence of exhaust heat from the engine and dust from the outside. Hereinafter, embodiments of the present invention will be described with reference to the drawings.

The configuration of a combine 1 according to the present embodiment will be described with reference to FIGS. 1 to 16. Note that in the following description, left and right sides when facing forward of the combine 1 will be referred to as the left and right sides of the combine 1, respectively.

Figure 1:
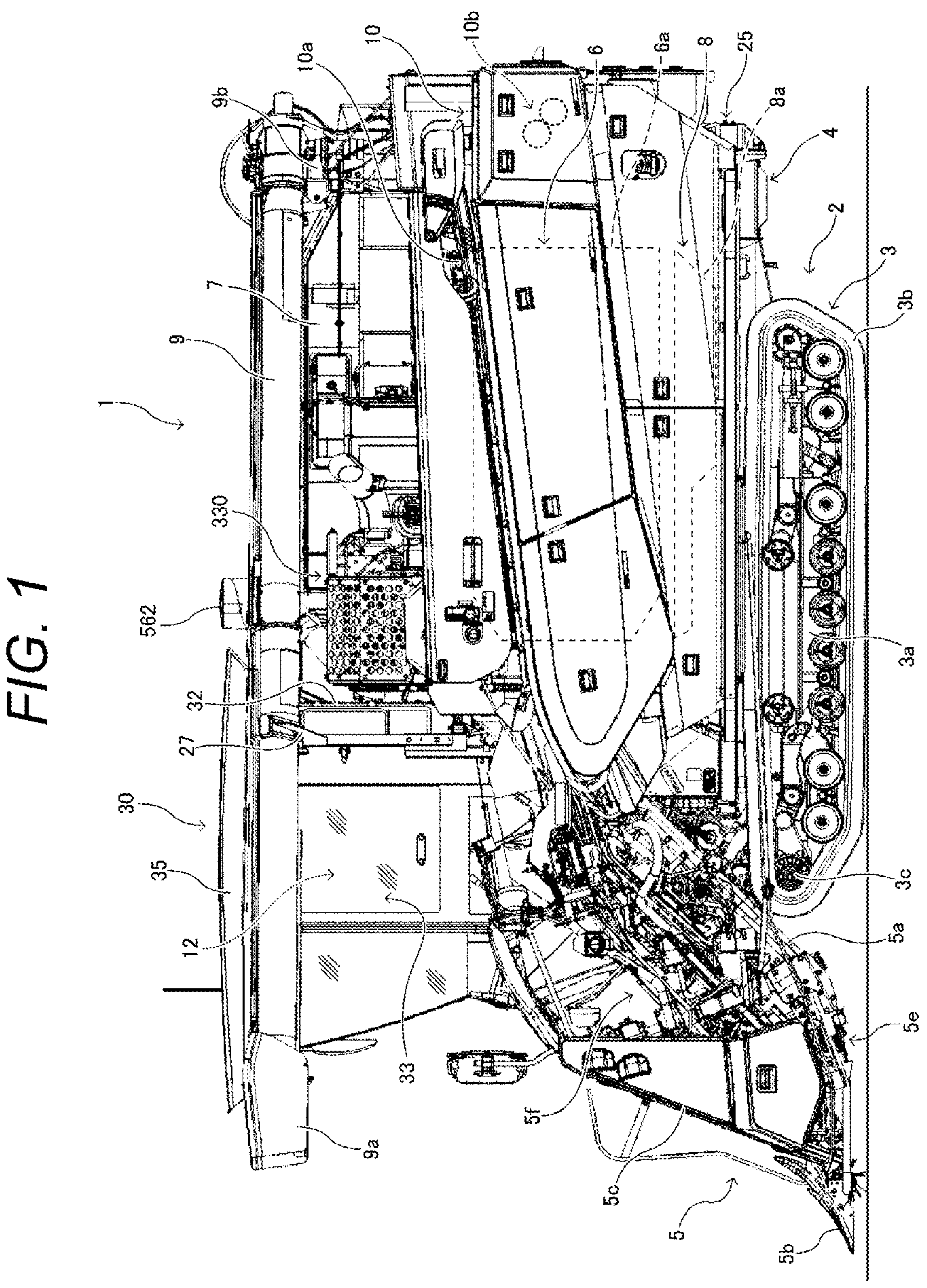
FIG. 1 is a left side view of a combine according to one embodiment of the present invention.
Figure 2:
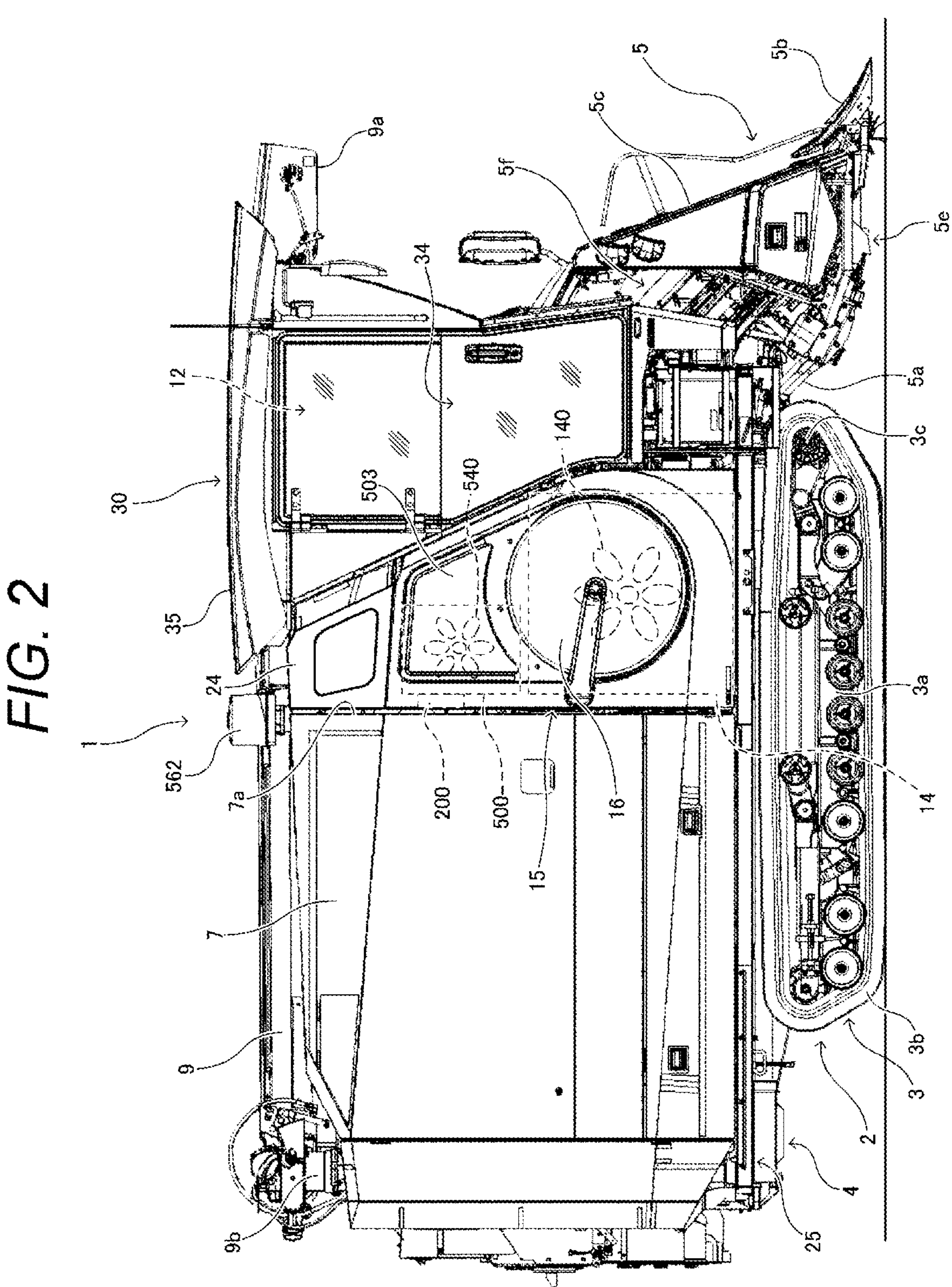
FIG. 2 is a right side view of the combine according to one embodiment of the present invention.
Figure 3:
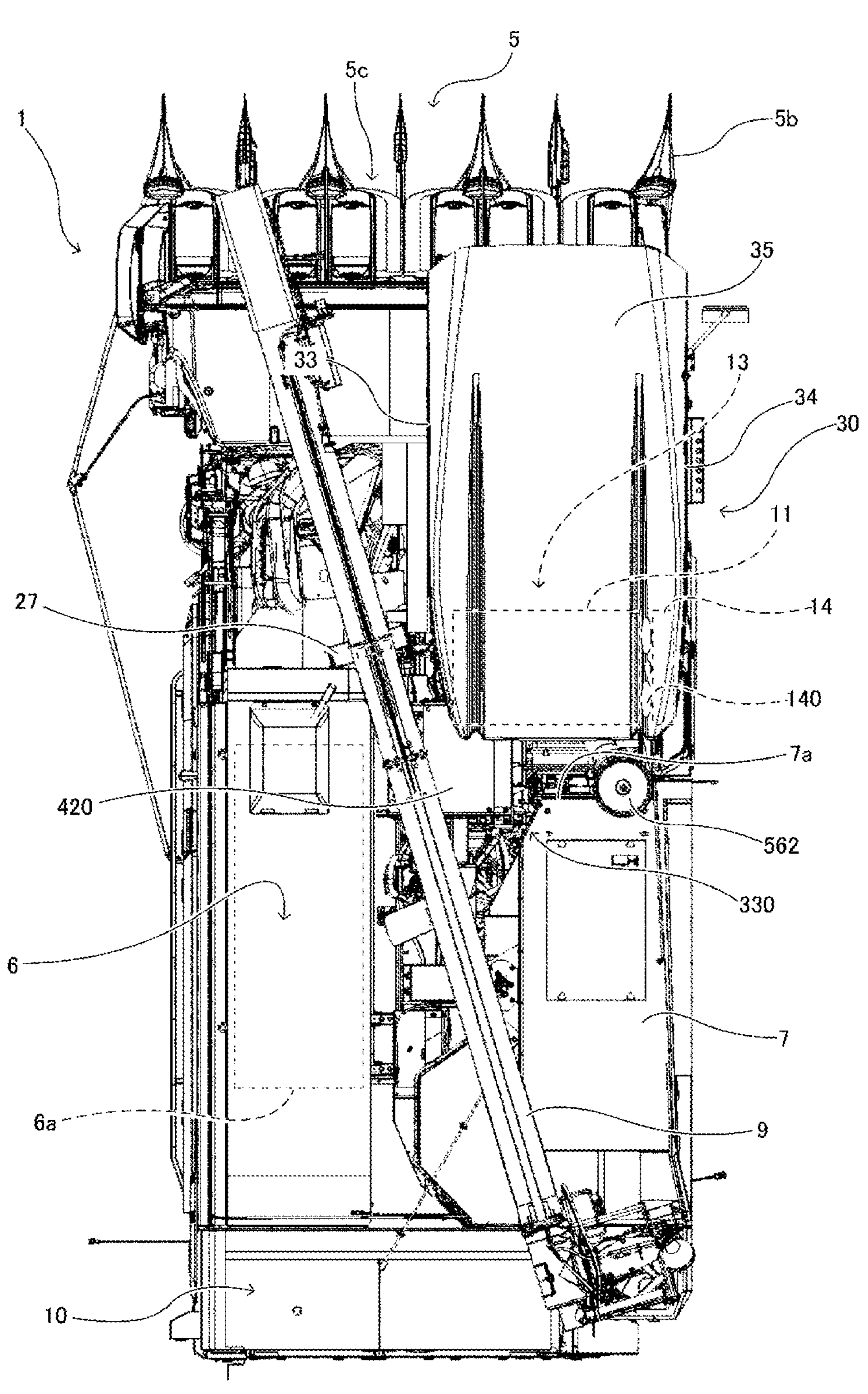
FIG. 3 is a plan view of the combine according to one embodiment of the present invention.

As shown in FIGS. 1 to 3, the combine 1 includes a traveling unit 2 configured as a crawler type traveling device having a pair of left and right crawler units 3, 3, and a traveling machine body 4 supported by the traveling unit 2.

Arranged side by side on the traveling machine body 4 are harvesting device members such as a cabin 30 on which a worker rides when harvesting grains, a steering unit 12 for steering the combine by the worker, a reaping unit 5 that performs operation necessary for harvesting grains, a threshing unit 6, a grain tank 7, a sorting unit 8, a discharge auger 9, and a waste straw processing unit 10.

Each crawler unit 3 forming the traveling unit 2 includes a truck frame 3*a* extending in the front-rear direction below the traveling machine body 4, various rotating bodies supported by the truck frame 3*a*, and a crawler belt 3*b* wound around these rotating bodies.

The crawler unit 3 includes, as the rotating bodies supported by the truck frame 3*a*, e.g., a drive sprocket 3*c* supported by a front end portion of the truck frame 3*a*, and is driven to travel by transmission of power from an engine 11 mounted on the traveling machine body 4.

The reaping unit 5 is provided at a front portion of the traveling machine body 4 over the substantially entire machine body width of the combine 1 so as to gather grain stalks from a field while cutting the grain stalks. The reaping unit 5 is attached to the traveling machine body 4 so as to turn about a predetermined axis via a hydraulic cylinder for lifting and lowering the reaping unit 5, and is provided adjustable in lifting and lowering by turning by extension and contraction of the hydraulic cylinder.

The reaping unit 5 has a reaping support machine frame 5*a* as a reaping frame, and is configured such that the reaping support machine frame 5*a* supports a grass divider 5*b*, a raising device 5*c*, a cutting blade device 5*e*, and a grain stalk carrying device 5*f*.

With this configuration, the grain stalks in the field can be divided by the grass divider 5*b*, the divided grain stalks can be raised by the raising device 5*c*, and the raised grain stalks can be cut by the cutting blade device 5*e* while carried rearward by the grain stalk carrying device 5*f*. Each device of the reaping unit 5 is operated by power transmitted from the engine 11 included in the combine 1.

In addition, as shown in FIG. 3, the threshing unit 6 that threshes the grain stalks cut by the reaping unit 5 and the grain tank 7 as a grain storage unit that stores the grains taken out of the threshing unit 6 are arranged side by side in the left-right direction on the traveling machine body 4.

As shown in FIG. 1, the threshing unit 6 has a threshing cylinder 6*a* and a processing cylinder (not shown) of which the rotation axis direction is the front-rear direction, and a grain stalk supply device provided on the left side of the threshing cylinder 6*a*. The grain stalk supply device carries the grain stalks rearward in such a lying posture that the tips of the grain stalks are on a threshing cylinder 6*a* side with the roots of the grain stalks sandwiched by the grain stalk supply device. The grain stalk supply device has a feed chain wound around a plurality of sprockets of which the rotation axis direction is the left-right direction, and a grain stalk supply gripping body (not shown) that grips the roots of the grain stalks in cooperation with the feed chain.

As shown in FIG. 1, the sorting unit 8 that sorts a processed object threshed by the threshing unit 6 is provided below the threshing unit 6 on the traveling machine body 4. The sorting unit 8 includes a swing sorting device 8*a*, a wind sorting device, and a grain carrying device. The swing sorting device 8*a* swings and sorts the processed object having fallen from the threshing unit 6, and the wind sorting device sorts, using wind, the processed object after swing sorting.

After wind sorting, the sorting unit 8 carries grains of the processed object rightward toward the grain tank 7 by the grain carrying device, and blows straws, dust, and the like rearward to discharge the straws, the dust, and the like to the outside of the machine body by the wind sorting device. The grains carried toward the grain tank 7 by the grain carrying device are stored in the grain tank 7.

As shown in FIG. 3, the discharge auger 9 that discharges the grains in the grain tank 7 to the outside is provided at a right rear end portion on the traveling machine body 4 so as to turn via a vertical pickup conveyor 9*b* provided on the right rear side of the traveling machine body 4. Note that in FIG. 3, a reference numeral 27 indicates an auger rest on which the discharge auger 9 is mounted and supported in a housed state and the auger rest 27 is provided on the left side at a rear portion of the cabin 30.

The grains stored in the grain tank 7 are carried by the discharge auger 9 having a screw conveyor therein, and are discharged through a discharge port 9*a* provided in a tip end portion of the discharge auger 9. The grains discharged through the discharge port 9*a* are injected into, e.g., a loading platform or a container of a truck.

As shown in FIG. 1, the waste straw processing unit 10 that processes waste straws after threshing by the threshing unit 6 is provided at the rear of the threshing unit 6 on the traveling machine body 4. The waste straw processing unit

10 includes a waste straw carrying device 10*a* that carries the grain stalks (waste stalks) rearward to discharge the grain stalks to the outside of the machine body, and a waste straw cutting device 10*b* that cuts the waste stalks carried from the waste straw carrying device 10*a* to discharge the cut stalks to the outside of the machine body.

On the traveling machine body 4, the cabin 30 covering the steering unit 12 is further provided at the right of the reaping unit 5 and the front of the grain tank 7. That is, the steering unit 12 is provided in the cabin 30 provided at the front portion on the traveling machine body 4.

Figure 4:
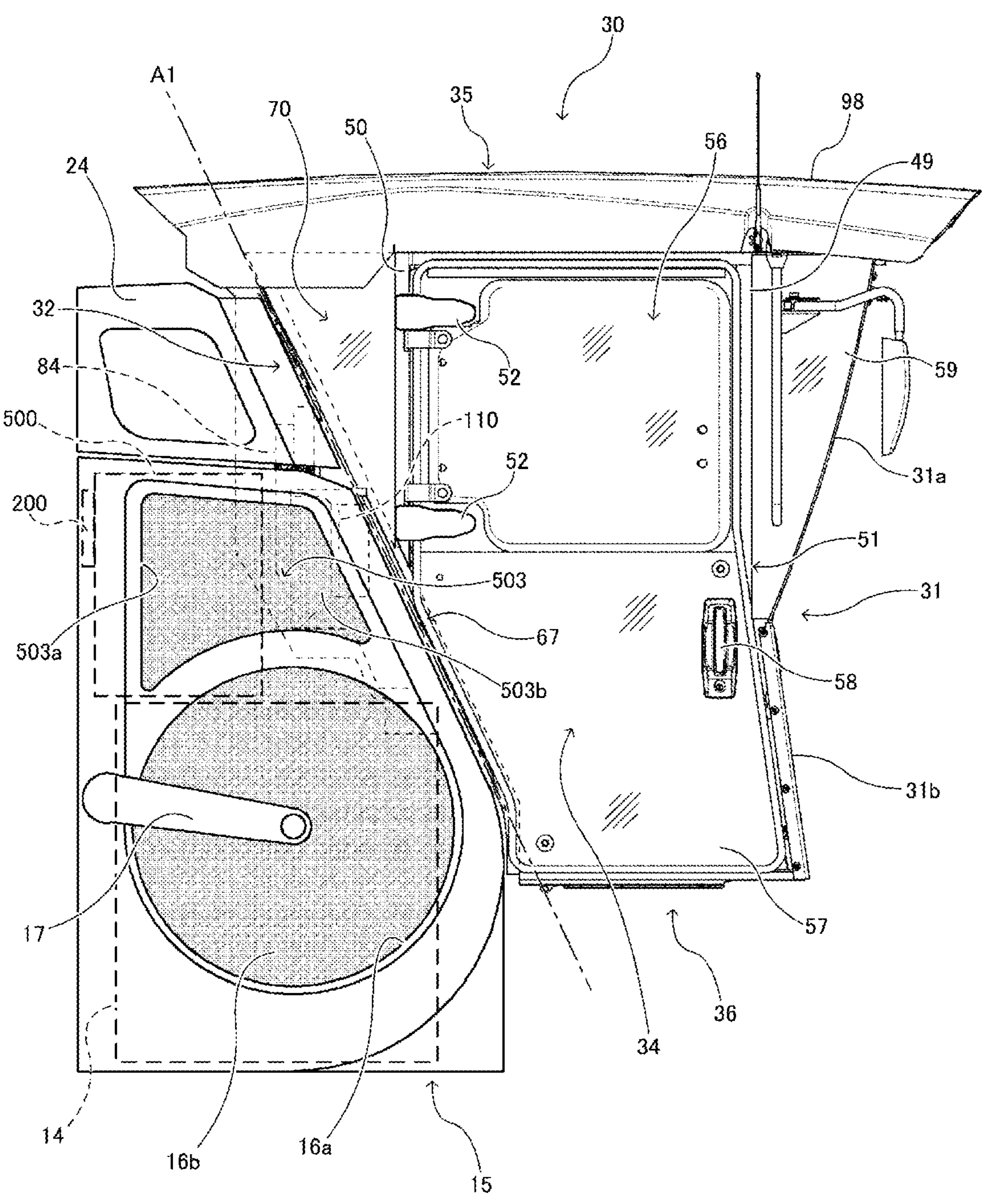
FIG. 4 is a right side view of a cabin and an outside air introduction cover according to one embodiment of the present invention.
Figure 5:
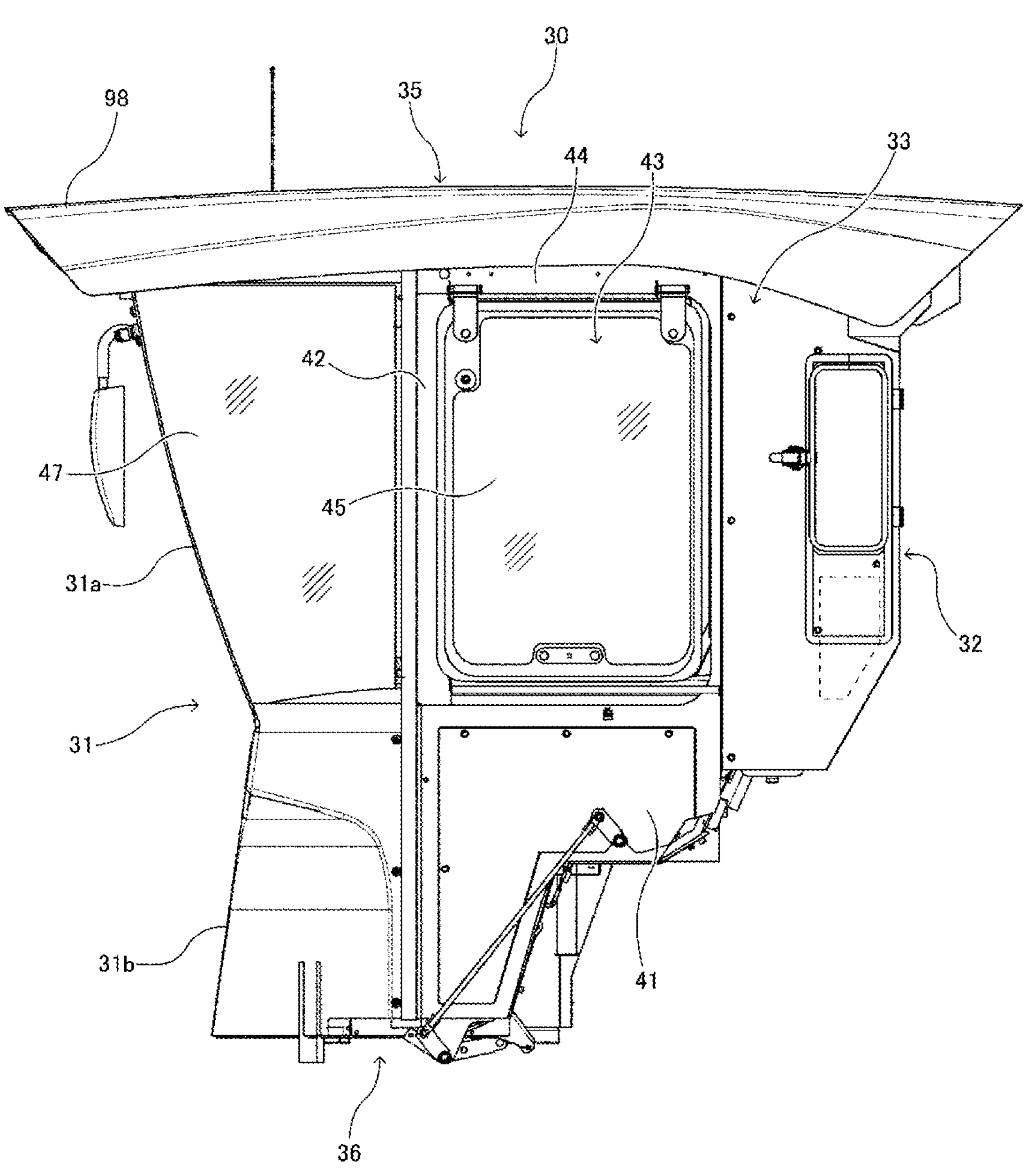
FIG. 5 is a left side view of the cabin according to one embodiment of the present invention.
Figure 6:
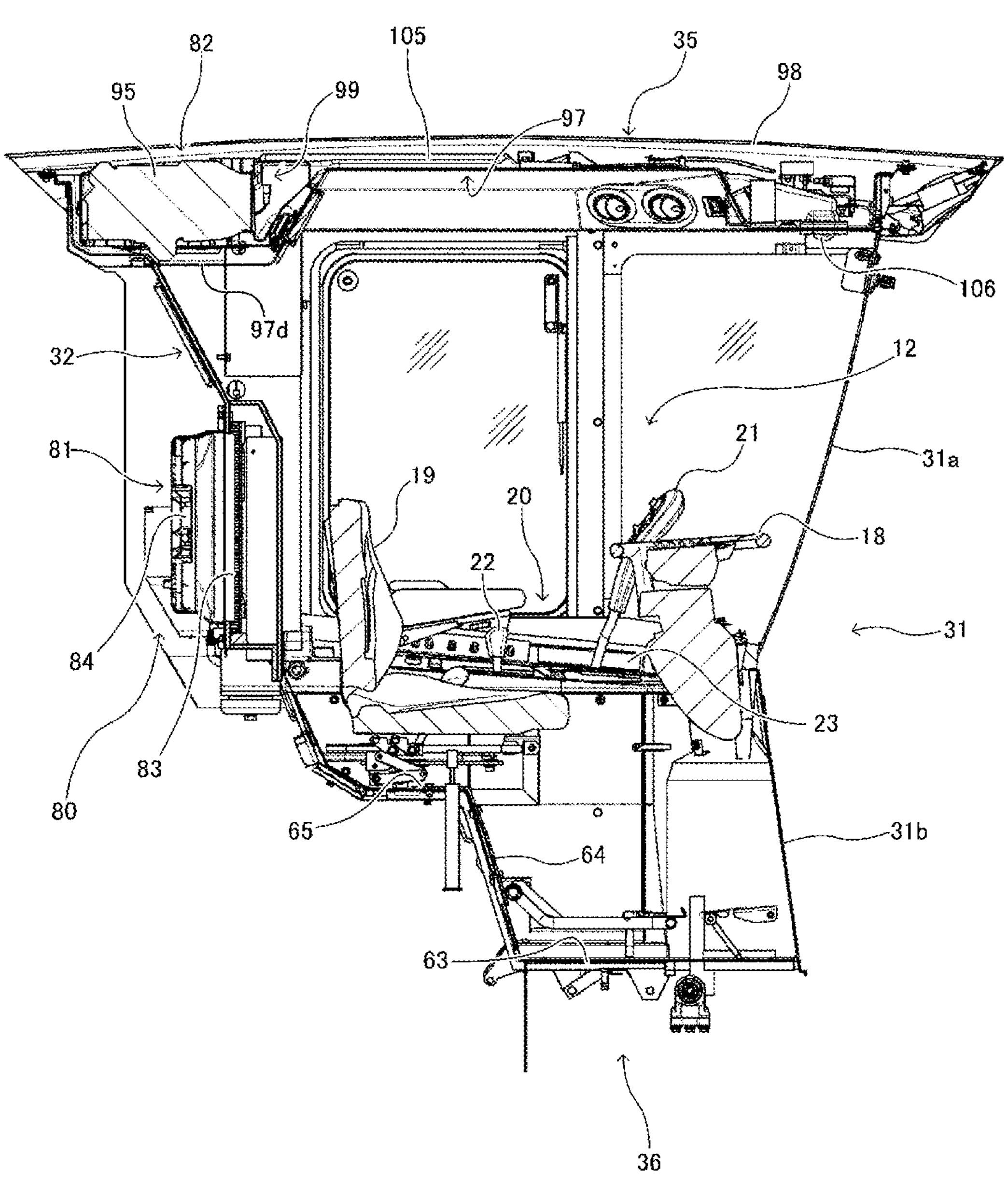
FIG. 6 is a right side view of the cabin according to one embodiment of the present invention.

As shown in FIGS. 4 to 6, the cabin 30 has a front portion 31, a rear wall portion 32, a left wall portion 33, and a right wall portion 34 forming four side wall portions, a roof portion 35 forming a ceiling portion, and a floor portion 36, which is in a substantially box shape as a whole.

The front portion 31 of the cabin 30 has a front upper portion 31*a* forming an upper half portion of the front portion 31 and inclined forward and a front lower portion 31*b* forming the substantially lower half portion of the front portion 31 and inclined downward to the front, and as a whole, is formed in a bent shape recessed rearward in a side view. The front upper portion 31*a* is a transparent window portion including a rectangular transparent plate, and the front lower portion 31*b* is a front lower wall portion including a metal plate such as a steel plate.

As shown in FIG. 5, the left wall portion 33 of the cabin 30 has a substantially upper half portion as a transparent window portion and a substantially lower half portion as a lower side portion 41 made of sheet metal such as a steel plate. A left strut portion 42 extending linearly along the up-down direction is provided substantially at the center of the left wall portion 33 in the front-rear direction, and a transparent left front window portion 47 and a transparent left rear window portion 43 are each arranged on the front and rear sides of the left strut portion 42.

The left rear window portion 43 is configured, above the lower side portion 41, such that a rectangular transparent plate 45 is attached to a frame-shaped window frame 44 having the left strut portion 42 as a front side portion. The left front window portion 47 has a substantially inverted trapezoidal shape, and has a front side portion along the forward inclination of the front upper portion 31*a* of the front portion 31.

As shown in FIG. 4, the right wall portion 34 of the cabin 30 includes an entrance door 51 forming a large portion of the right wall portion 34 and a right front window portion 59 and a transparent window 70 each arranged on the front and rear sides of the door 51.

The door 51 is provided between a right front strut portion 49 and a right rear strut portion 50 standing with a certain clearance therebetween in the front-rear direction so as to turn about supports 52 provided at two upper and lower locations on the right rear strut portion 50. The door 51 includes an upper half portion as an openable window portion 56, a lower half portion as a lower wall portion covered with a transparent plate 57, and a handle 58 at a front portion of the lower wall portion.

The right front strut portion 49 has a lower portion extending along the inclination of the front lower portion 31*b* of the front portion 31 in a side view and an upper portion extending in the up-down direction, and stands at a position on the right front side of the floor portion 36. The right rear strut portion 50 is parallel with the upper portion of the right front strut portion 49 at the substantially same height position, and stands at the center of a right edge portion of the rear wall portion 32, which is inclined downward to the front, in the front-rear direction in a side view.

The right front window portion 59 has a substantially inverted triangular shape, and a front side portion thereof is formed along the inclination of the front portion 31. The transparent window 70 has a substantially inverted triangular shape, and a rear side portion thereof is formed along the inclination of the rear wall portion 32.

The rear wall portion 32 of the cabin 30 is provided as an inclined portion inclined downward to the front (upward to the rear) so as to extend from the lower side to the upper side as extending from the front side to the rear side, and is inclined rearward in a side view. As shown in FIGS. 5 and 6, the rear wall portion 32 stands upwardly diagonally to the rear from the rear side of a seat support portion 65, and an upper end portion thereof connected to the roof portion 35 is positioned at a location near a rear end portion of the roof portion 35.

The roof portion 35 of the cabin 30 has a substantially rectangular shape of which the longitudinal direction is the front-rear direction in a side view, and has front and rear edge portions each protruding in an eave shape to the front and rear sides of upper end portions of the front portion 31 and the rear wall portion 32.

As shown in FIG. 6, the floor portion 36 of the cabin 30 forms a horizontal floor surface portion 63 on the front lower side of a driver seat 19. The substantially horizontal seat support portion 65 is provided on the rear side of the floor surface portion 63 via an inclined portion 64 inclined downward to the front. The driver seat 19 forming the steering unit 12 is placed on the seat support portion 65.

As shown in FIG. 6, the steering unit 12 includes, in the cabin 30, a steering wheel 18 for steering, the driver seat 19 provided at the rear of the steering wheel 18, and a side operation unit 20 provided at the left of the driver seat 19. The side operation unit 20 is configured such that various operation tools such as a main transmission lever 21 and an auxiliary transmission lever 22 are arranged at a side column 23.

As shown in FIG. 3, a motor unit including the engine 11 placed in an engine room 13 is provided on the rear lower side of the steering unit 12. The engine 11 is arranged at a position below the steering unit 12 on the right side of the front portion of the traveling machine body 4.

The engine 11 is a diesel engine, and transmits power thereof to various devices, such as the traveling unit 2, the reaping unit 5, the threshing unit 6, the sorting unit 8, the discharge auger 9, and the waste straw processing unit 10, via, e.g., a transmission. The engine 11 is arranged on a machine base 25 forming the traveling machine body 4 together with the threshing unit 6 and the grain tank 7.

Figure 7:
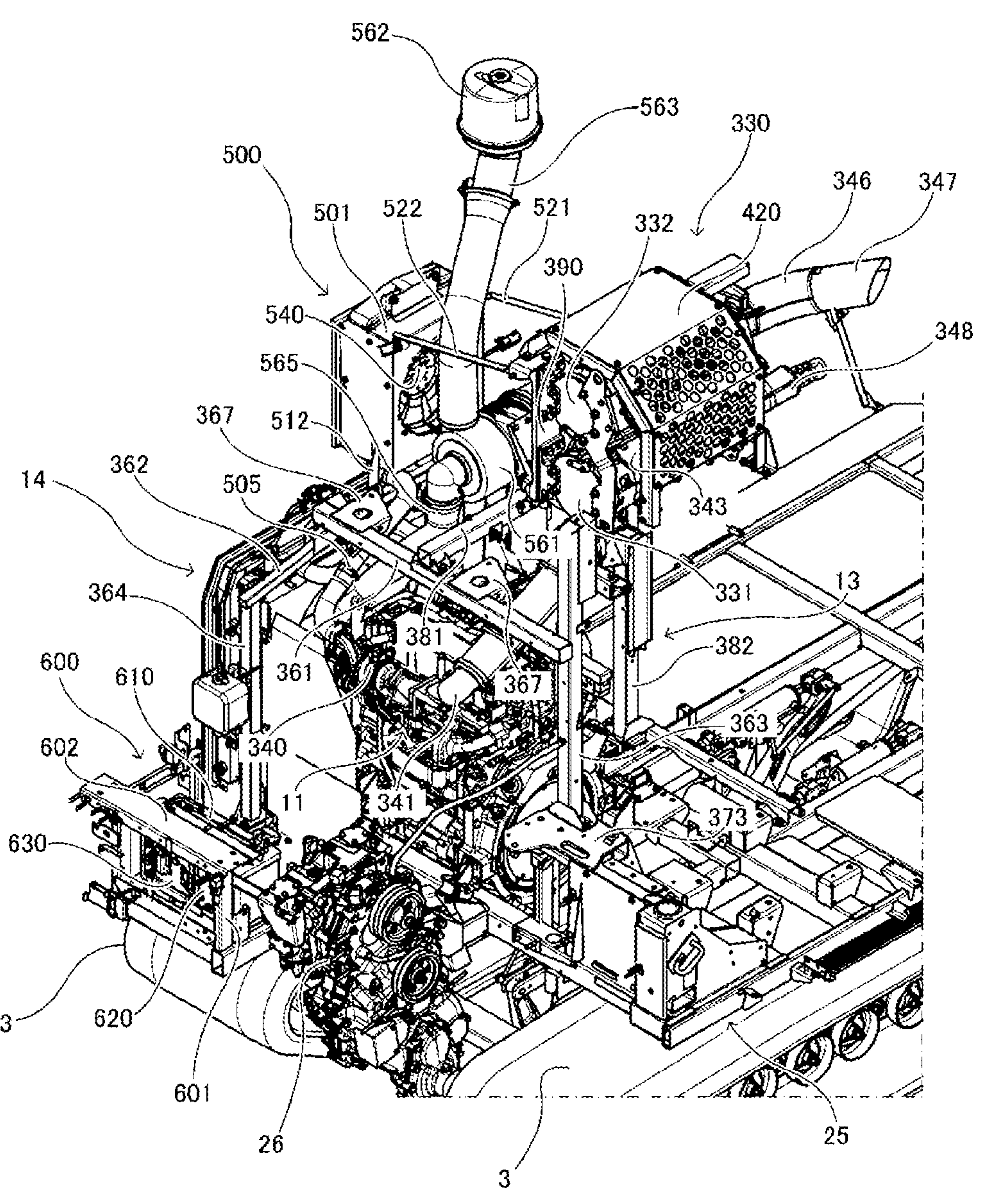
FIG. 7 is a left front perspective view showing a device configuration mounted on a front portion of a traveling machine body according to one embodiment of the present invention.
Figure 8:
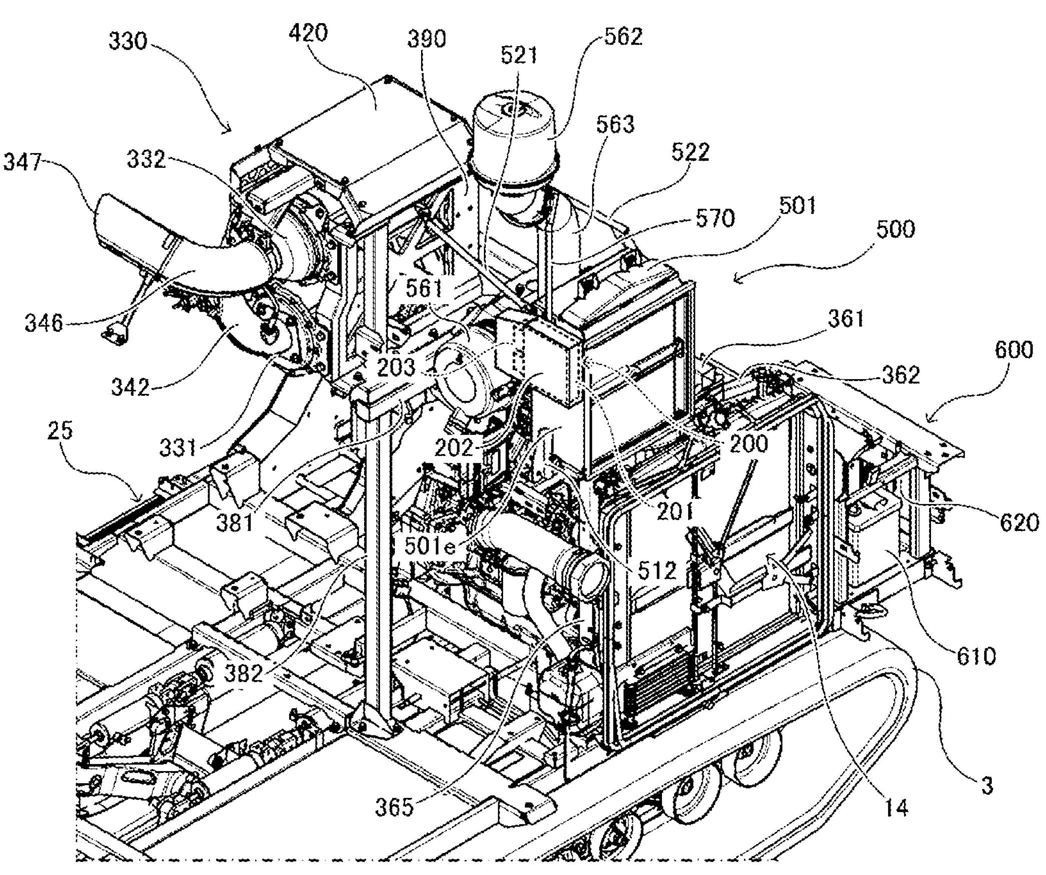
FIG. 8 is a right rear perspective view showing the device configuration mounted on the front portion of the traveling machine body according to one embodiment of the present invention.
Figure 9:
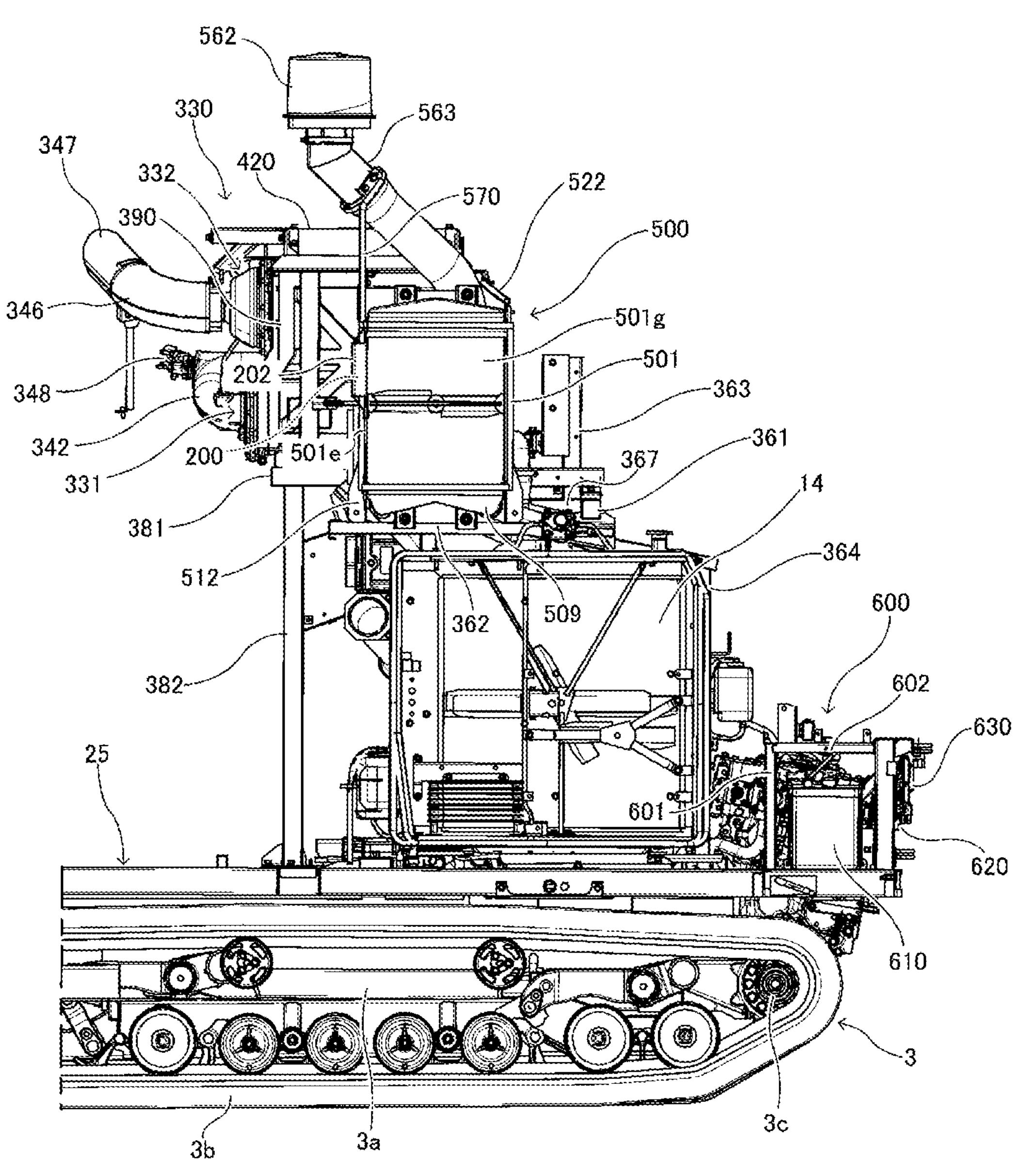
FIG. 9 is a right side view showing the device configuration mounted on the front portion of the traveling machine body according to one embodiment of the present invention.

In addition, as shown in FIG. 7, the engine 11 is configured such that a supercharger 340 having a compressor and a turbine rotatably and coaxially drivable at both ends of a rotary shaft is communicably connected to an intake manifold on an air suction side and an exhaust manifold on an exhaust gas discharge side.

The supercharger 340 is configured to rotate the turbine at one end of the rotary shaft and rotate the compressor at the other end of the rotary shaft by exhaust gas discharged from the engine 11 to forcibly send air into the engine 11.

As shown in FIGS. 7 to 10, the engine 11 includes an air cleaner 561, an air supply pipe 563, and a pre-cleaner 562 forming an air supply system of the engine 11. The air cleaner 561 and the pre-cleaner 562 are connected to each other via the air supply pipe 563.

The pre-cleaner 562 is provided at an upstream end portion of an air supply path of the engine 11, and removes powder dust and the like while taking atmospheric air into the air supply path to purify the atmospheric air taken into the air supply path. The air cleaner 561 further purifies the air purified by the pre-cleaner 562 and sent via the air supply pipe 563, and supplies the purified air to the engine 11.

The air cleaner 561 has a substantially cylindrical outer shape, and is arranged between a later-described exhaust gas purification device 330 and an intercooler 500 such that the tube axis direction thereof is the front-rear direction. As shown in FIG. 7, a downstream air supply pipe 565 extends from the air discharge side of the air cleaner 561, and the downstream side of the downstream air supply pipe 565 is communicably connected to an air intake portion provided on the compressor side of the supercharger 340.

The air supply pipe 563 is supported on the intercooler 500 by a straight rod-shaped pipe support rod 570 extending from the intercooler 500. The pipe support rod 570 has a lower end portion fixedly supported by an upper portion of a rear portion 501*e* of a case 501 with, e.g., a bolt and an upper end portion fixedly supported by an intermediate portion of the air supply pipe 563.

As shown in FIGS. 1 and 2, the combine 1 has the machine base 25 on the truck frame 3*a*. On the truck frame 3*a*, the machine base 25 is horizontally formed of, e.g., a frame member or a plate-shaped member arranged in the front-rear direction or the left-right direction. The rear side of the machine base 25 extends rearward from the rear ends of the crawler units 3 in the front-rear direction.

At a position close to the right side at a front portion of the machine base 25, the engine 11 is mounted in such an orientation that the axial direction of an output shaft is the left-right direction. In addition, the threshing unit 6 and the grain tank 7 are arranged at the rear of the engine 11. As shown in FIG. 7, a transmission case 26 for transmitting the power of the engine 11 to the crawler units 3 is arranged between the left and right crawler units 3 on the front side of the machine base 25.

As shown in FIG. 7, a step support frame 600 that supports and forms the floor surface portion 63 of the floor portion 36 at the front end of the machine base 25 is provided at a position below the floor portion 36 of the cabin 30. The step support frame 600 is provided on the lower front side of the steering unit 12 (front portion of the machine base 25) such that a plurality of vertical and horizontal frames 601, 602 is assembled into a quadrangular frame shape, and a battery 610 for power supply, a steering case (not shown), and a continuously variable transmission case are arranged in an inner space thereof.

A rectangular plate-shaped shielding plate 620 that substantially closes the front opening of the step support frame 600 is installed on the front side of the step support frame 600. In the present embodiment, a standard controller 630 that performs various types of control for power supply, lifting and lowering in reaping, a hydraulic valve, and the like for the combine is provided on the further front side surface of the shielding plate 620.

That is, the battery 610 for power supply is mounted below the steering unit 12 on the rear side of the shielding plate 620. Below the steering unit 12, the standard controller 630, the shielding plate 620, and the battery 610 are positioned in this order from the front in the front-rear direction at the front of the engine 11.

With this configuration, the standard controller 630 and the engine 11 are each positioned on the front and rear sides with respect to the inner space of the step support frame 600. Further, since the battery 610 and the shielding plate 620 are positioned between the standard controller 630 and the engine 11, both the battery 610 and the shielding plate 620 shield exhaust heat from the engine 11 to the standard controller 630.

As shown in FIG. 6, the cabin 30 includes an air-conditioning device 80 that performs cooling/heating operation for the inside of the cabin 30. The air-conditioning device 80 is operated by an air-conditioning operation unit (not shown) provided in the steering unit 12. The air-conditioning operation unit includes, for example, a switch that turns on/off the air-conditioning device 80 and a dial that adjusts a set temperature.

The air-conditioning device 80 includes a condenser unit 81 provided as a so-called outdoor unit on the rear wall portion 32 of the cabin 30 and an air-conditioner unit 82 provided as a so-called indoor unit in the roof portion 35 of the cabin 30.

The air-conditioner unit 82 includes a heat exchanger 95 having an evaporator, a heater, and the like, and a blower fan that blows air to the heat exchanger 95, and is provided at a position above the condenser unit 81 in the roof portion 35 in a state in which the heat exchanger 95 and the blower fan communicate with each other.

The roof portion 35 has a lower panel portion 97 and an upper panel portion 98 provided on the upper side of the lower panel portion 97, and is formed in a flat hollow outer shape. A recessed portion 97*d* protruding downward is formed at a rear portion of the lower panel portion 97, and forms an air-conditioner housing portion 99 that houses the air-conditioner unit 82.

On the front side of the air-conditioner unit 82 in the roof portion 35, an air blowing duct 105 for sending air-conditioning air obtained by the air-conditioner unit 82 into the cabin 30 is provided. For example, cold air generated by the heat exchanger 95 is pumped in the air blowing duct 105, and is blown out from a blow-out port 106 provided in the cabin 30.

As shown in FIG. 4, an outside air introduction cover 15 is provided at the rear of the cabin 30 having such a configuration. The outside air introduction cover 15 has a front portion obliquely facing the rear edge of the cabin 30 in a side view.

The outside air introduction cover 15 has a substantially right trapezoidal shape, and on the right side of the combine 1, is flush with the right surface of the grain tank 7 between the cabin 30 and the grain tank 7. That is, on the traveling machine body 4, the grain tank 7 is positioned at the rear of the cabin 30, and is provided at the rear of the outside air introduction cover 15 in the front-rear direction. The outside air introduction cover 15 is supported so as to turn via a hinge portion (not shown) relative to a strut standing on the traveling machine body 4 along the rear edge of the cabin 30.

As shown in FIG. 4, a front portion of the outside air introduction cover 15 and a rear portion of the cabin 30 overlap with each other in a side view, and the opposing edges of the outside air introduction cover 15 and the cabin 30 form a boundary portion 67 along a boundary A1.

As shown in FIG. 4, upper and lower portions of a cover surface of the outside air introduction cover 15 are each provided with a suction port 503 for introducing outside air into the intercooler 500 as an upper cooling device and a rotary screen 16 for introducing outside air into a radiator 14 as a lower cooling device.

In other words, inside the outside air introduction cover 15, the intercooler 500 as the upper cooling device is arranged so as to mostly overlap with the suction port 503 in a right side view, and the radiator 14 as the lower cooling device is arranged so as to mostly overlap with the rotary screen 16 in a right side view.

The rotary screen 16 at the lower portion of the outside air introduction cover 15 is rotatably supported by an opening 16*a* formed in the outside air introduction cover 15, and is configured to rotate by drive of a motor (not shown).

Specifically, the rotary screen 16 includes a rotary support that rotates at the center of the circular opening 16*a*, a circular dustproof net 16*b* stretched over the rotary support so as to close the opening 16*a*, and a suction device 17 that contacts the dustproof net 16*b* on the outside to suck and remove collected dust. This configuration prevents dust from entering the engine room 13 together with outside air.

As shown in FIG. 4, the suction port 503 at the upper portion of the outside air introduction cover 15 is configured such that a dustproof net 503*b* is stretched over an opening 503*a* formed in the outside air introduction cover 15. The opening 503*a* and the dustproof net 503*b* have an arc shape which is along the outer shape of the upper portion of the outside air introduction cover 15 and is along the circular shape of the opening 16*a* of the rotary screen 16 on the lower side.

An upper cover portion 24 is provided above the outside air introduction cover 15. The upper cover portion 24 is in a substantially trapezoidal plate shape, and is provided so as to form a right side surface portion flush with the outside air introduction cover 15. The upper cover portion 24 is provided with fixed to, e.g., a predetermined frame.

As shown in FIGS. 2 and 4, the intercooler 500 and the radiator 14 as cooling devices for cooling the engine 11 are arranged, between the outside air introduction cover 15 and the engine 11, side by side in the up-down direction on the traveling machine body 4. That is, the intercooler 500 and the radiator 14 as the cooling devices are arranged at side end portions of the traveling machine body 4, and the engine 11 is arranged on one side of the intercooler 500 and the radiator 14 as the cooling devices in the front-rear direction of the traveling machine body 4.

That is, the cooling devices for cooling the engine 11 include two upper and lower components, i.e., the intercooler 500 that is arranged on the upper side with respect to a later-described support frame 360 and cools air supplied to the engine 11 and the radiator 14 that is arranged on the lower side and cools coolant in the engine 11. That is, the intercooler 500 and the radiator 14 as the cooling devices are coupled to and supported by the support frame 360 on the traveling machine body 4.

The radiator 14 as the lower cooling device is provided in the middle of a path of circulating coolant in the engine 11, and is configured to cool coolant sent from the engine 11 by heat exchange with outside air.

The radiator 14 as the lower cooling device is provided in the middle of the path of circulating coolant in the engine 11, and is configured to cool coolant sent from the engine 11 by heat exchange with outside air sucked into the engine room 13 by a cooling fan 140.

Figure 11:
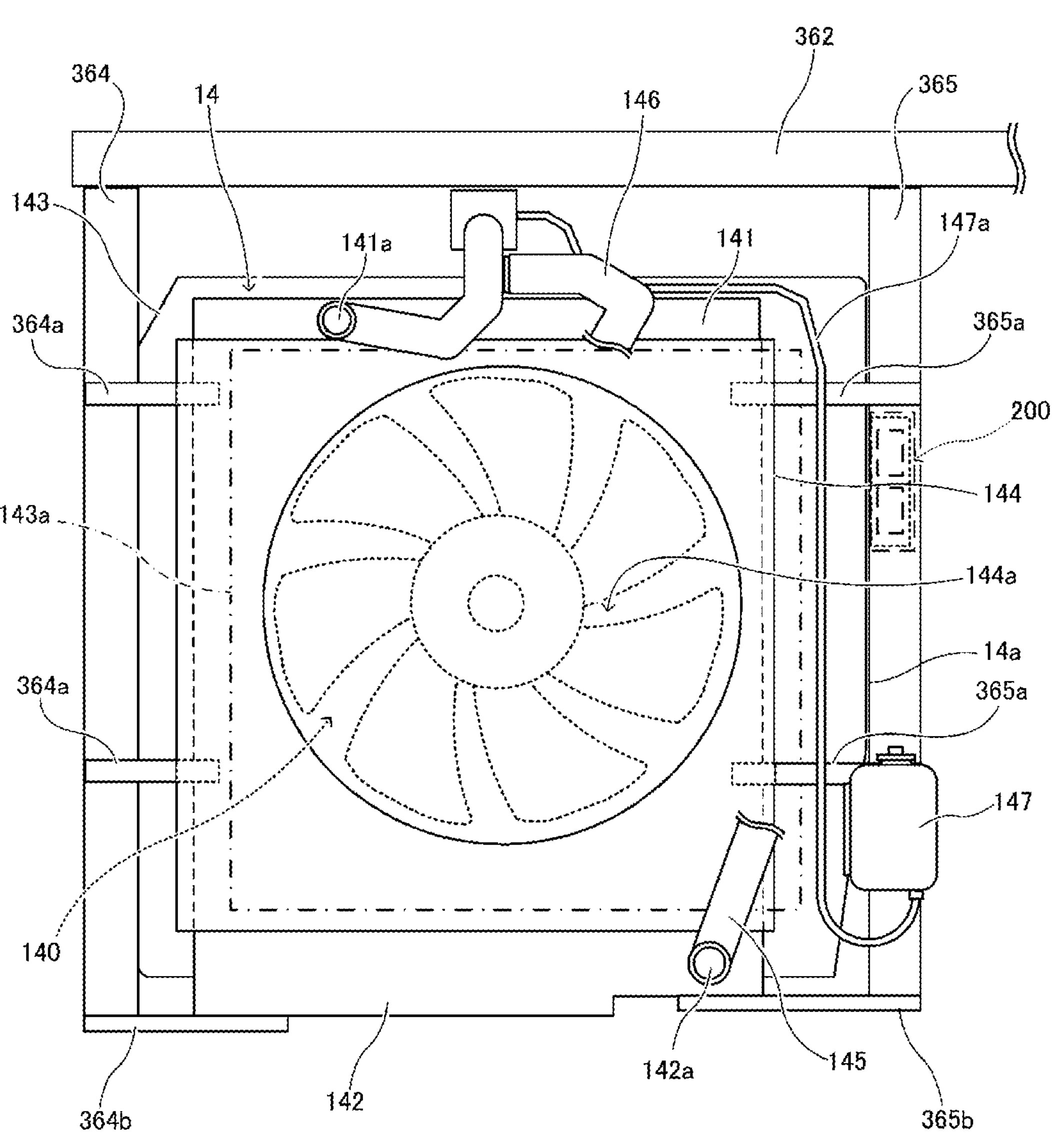
FIG. 11 is a left side view showing a radiator according to one embodiment of the present invention.

As shown in FIG. 11, the radiator 14 has a rectangular box-shaped outer shape, and includes an upper tank 141 that temporarily stores coolant sent from the engine 11, a lower tank 142 that temporarily stores cooled coolant, a plurality of tubes (not shown) extending in the up-down direction and arranged side by side in the left-right direction between the upper tank 141 and the lower tank 142, and a plurality of fins (not shown) externally fitted and fixed to the tubes.

The tubes are communicably connected to the upper tank 141 and the lower tank 142 at upper and lower end portions, and cool coolant flowing therein by heat exchange by contact of cooling air sucked from the outside by the cooling fan 140 with the fins.

The radiator 14 stands, in an orientation in which the thickness direction thereof is the left-right direction, between the engine 11 and the outside air introduction cover 15 as an engine cover of the engine room 13 covering the right side of the engine 11.

The cooling fan 140 is provided on the right side of the engine 11, and the radiator 14 is placed on the right side thereof. The cooling fan 140 has a rotary shaft directly connected to a drive shaft of the engine 11, and is rotatably driven in an intake direction along with drive of the engine 11.

The radiator 14 has a radiator frame 143 in a rectangular frame shape in a side view. The radiator 14 is attached to the radiator frame 143 so as to entirely cover a rectangular exhaust-side opening of the radiator frame 143. A dustproof screen 143*b* that traps dust and the like is stretched over an outside intake-side opening 143*a* of the radiator frame 143.

A shroud 144 is provided between the radiator 14 and the cooling fan 140. Since the cooling fan 140 is covered with the shroud 144, outside air suction by the cooling fan 140 is promoted, and cooling air is efficiently blown onto the radiator 14.

The shroud 144 is a quadrangular box-shaped member having the same size as that of the radiator 14, and a surface (outer surface) on which the radiator 14 is arranged is opened entirely, and a suction hole 144*a* having a diameter slightly larger than the diameter of the cooling fan 140 is opened in a surface (inner surface) on which the cooling fan 140 is arranged. The shroud 144 is fixed to the radiator frame 143 with a fixing member such as a bolt with the radiator 14 interposed between the shroud 144 and the radiator frame 143.

Figure 10:
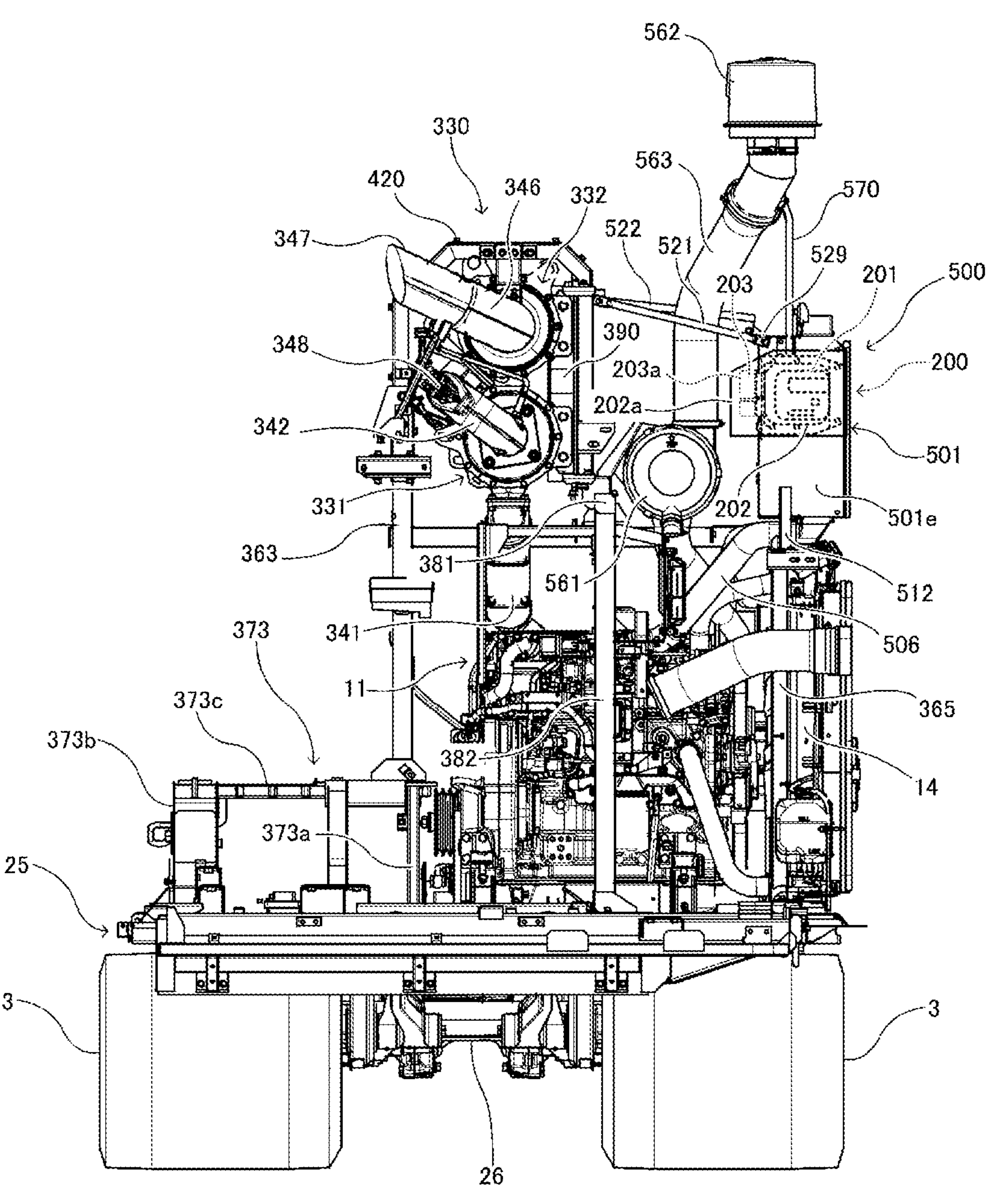
FIG. 10 is a rear view showing the device configuration mounted on the front portion of the traveling machine body according to one embodiment of the present invention.

As shown in FIGS. 10 and 11, a coolant inflow pipe 145 and a coolant outflow pipe 146 forming the coolant circulation path are arranged between the radiator 14 and the engine 11. The engine 11 has a cooler jacket (not shown) in which coolant circulates.

The upstream end of the coolant inflow pipe 145 is communicably connected to an outlet 142*a* of the lower tank 142 at the lower portion of the radiator 14. The downstream end of the coolant inflow pipe 145 is communicably connected to an inlet 110*a* of the cooler jacket of the engine 11. In addition, a pump (not shown) that circulates coolant is interposed between the coolant inflow pipe 145 and the cooler jacket.

The upstream end of the coolant outflow pipe 146 is communicably connected to an outlet 110*b* of the cooler jacket 110 of the engine 11. The downstream end of the coolant outflow pipe 146 is communicably connected to an inlet 141*a* of the upper tank 141 at the upper portion of the radiator 14. Note that the coolant outflow pipe 146 is communicably connected to a reservoir tank 147 to which coolant is supplied as necessary in a middle portion via a supply pipe 147*a*.

When the cooling fan 140 rotates, cooling air is taken into the engine room 13 from the outside air introduction cover 15 arranged on the right side of the radiator 14, and such outside air is used for heat exchange of coolant in the radiator 14 as described above. The cooling air generated in the engine room 13 by the cooling fan 140 sucking the outside air flows toward the engine 11, and directly cools the engine 11 by contacting the engine 11 at the outer periphery thereof.

The intercooler 500 as the upper cooling device is arranged between the cabin 30 and the grain tank 7. The intercooler 500 is provided such that the entire case 501 is covered with the outside air introduction cover 15 from the right.

That is, as shown in FIGS. 2 and 3, the grain tank 7 is provided such that a front portion 7*a*, which is a vertical planar portion, is positioned at the rear of the intercooler 500 (case 501) and the radiator 14 provided on the rear right side of the cabin 30.

As described above, the intercooler 500 and the radiator 14 as the cooling devices are positioned, on the right side of the traveling machine body 4, between the cabin 30 and the grain tank 7 in the front-rear direction.

The intercooler 500 functions as a heat exchanger that cools air discharged from the compressor of the supercharger 340 included in the engine 11. Air cooled by the intercooler 500 is supplied to the intake manifold of the engine 11 as air supplied to the engine 11.

An air inflow pipe 505 and an air outflow pipe 506 are arranged between the intercooler 500 and the engine 11.

Figure 12:
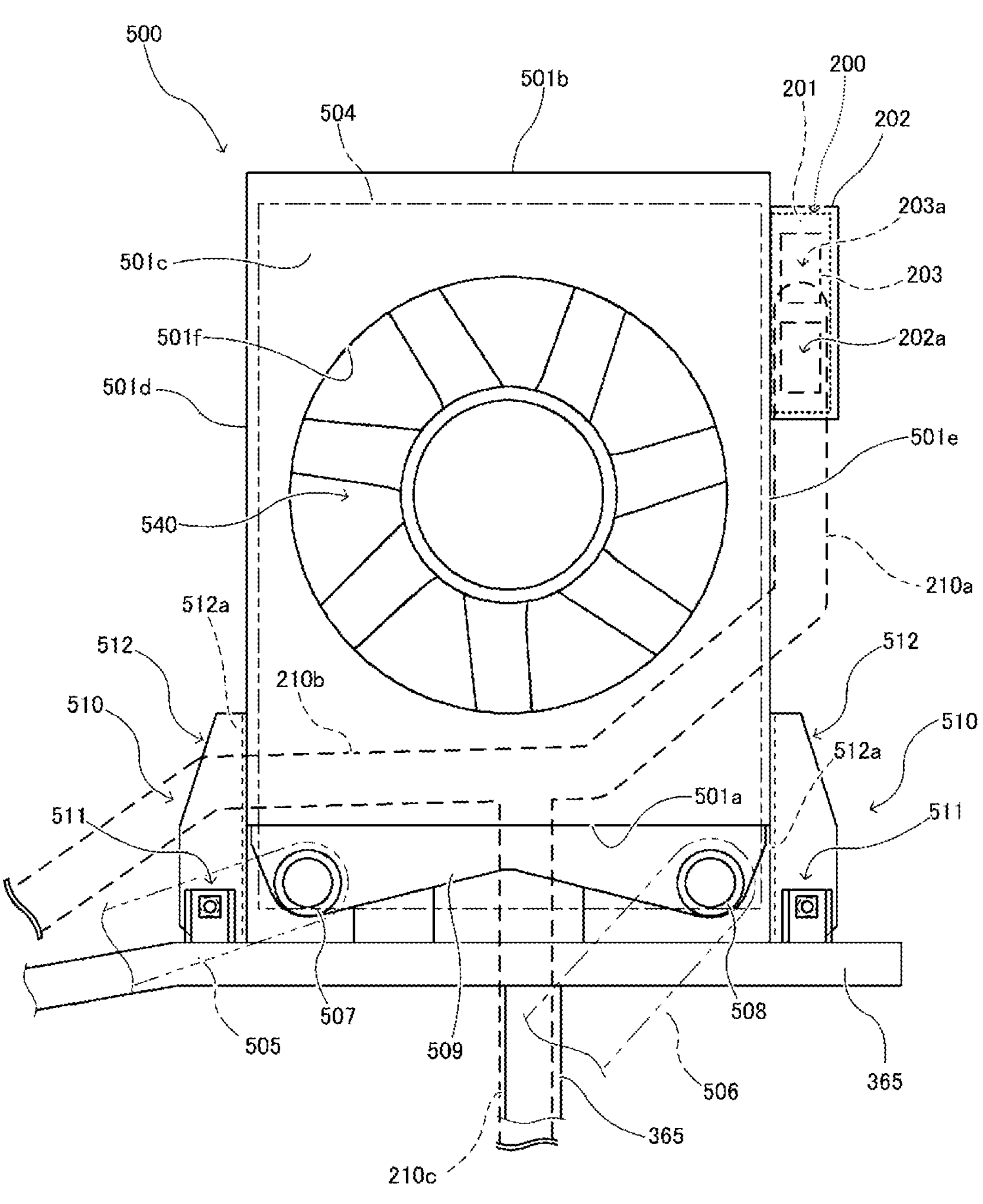
FIG. 12 is a left side view showing an intercooler according to one embodiment of the present invention.

The upstream end of the air inflow pipe 505 is communicably connected to the compressor side of the supercharger 340. As shown in FIG. 12, the downstream end of the air inflow pipe 505 is communicably connected to an inlet 507 provided in a lower front portion of a lower portion 501*a* of the case 501. The air inflow pipe 505 is arranged so as to extend under a front horizontal frame 361. The inlet 507 is a cylindrical protruding portion provided in a front portion of a duct portion 509 provided below the lower portion 501*a* of case 501 and opening leftward.

The air inflow pipe 505 is arranged so as to face leftward from the inlet 507, extends to the front lower side on the right side of the engine 11, and is connected, from the right, to the supercharger 340 provided at the front upper portion of the engine 11. Air discharged from the compressor of the supercharger 340 is supplied to the intercooler 500 via the air inflow pipe 505. The air is cooled while passing through a predetermined air passage 504 having fins and the like provided in the case 501.

The upstream end of the air outflow pipe 506 is communicably connected to an outlet 508 provided in a lower rear portion of the lower portion 501*a* of the case 501. The outlet 508 is a cylindrical protruding portion provided in a rear portion of the duct portion 509 and opening leftward. The downstream end of the air outflow pipe 506 is communicably connected to the intake manifold of the engine 11.

The air outflow pipe 506 extends to the left front lower side from the outlet 508, and is connected, from the right, to the intake manifold positioned at the rear upper portion of the engine 11. Air cooled in the case 501 is supplied to the intake manifold of the engine 11 via the air outflow pipe 506.

As shown in FIG. 12, the intercooler 500 forms the exterior of the device by the box-shaped case 501 having a substantially rectangular parallelepiped outer shape, and is placed in such an orientation that the longitudinal direction of the substantially rectangular parallelepiped outer shape of the case 501 is the front-rear direction in a plan view and is the up-down direction in a view in the front-rear direction. The intercooler 500 is provided, on the machine base 25, at a position on the right upper side of the engine 11 with supported by a predetermined support member.

The intercooler 500 includes a cooling fan 540 which is a cooling fan capable of blowing air toward the later-described exhaust gas purification device 330.

The cooling fan 540 is an electric fan including a fan main body and an electric fan motor as a drive source that drives the fan main body, and is configured to rotate the fan main body in both a forward rotation direction and a reverse rotation direction by the drive force of the fan motor.

The cooling fan 540 is arranged on the left side in the case 501 in such an orientation that the rotation axis direction of the fan main body is the left-right direction. A ventilation port 501*f* which is a circular opening concentric with the fan main body is formed in a left portion 501*c* of the case 501. The ventilation port 501*f* is formed such that the substantially entire cooling fan 540 is exposed in a left side view.

As shown in FIGS. 7 to 10, the exhaust gas purification device 330 that purifies exhaust gas from the engine 11 is arranged at a position on the left side of the intercooler 500. The exhaust gas purification device 330 purifies exhaust gas by removing, e.g., a particulate matter, such as soot, or nitrogen oxide (NOx) contained in exhaust gas.

The exhaust gas purification device 330 includes a substantially cylindrical DPF case 331 and a substantially cylindrical SCR case 332 having the substantially same size, and above the main body portion of the engine 11, the DPF case 331 and the SCR case 332 are arranged one above the other with the longitudinal direction thereof oriented in the front-rear direction.

That is, the exhaust gas purification device 330 is arranged at a position immediately at the rear of the rear wall portion 32 of the cabin 30 in the front-rear direction (see FIGS. 1 and 2), and is arranged at a position substantially at the center of the traveling machine body 4 in the left-right direction (position between the threshing unit 6 and the grain tank 7) (see FIG. 3). Moreover, the exhaust gas purification device 330 is arranged at a position below the roof portion 35 of the cabin 30 on the left rear side of the cabin 30 (see FIGS. 1 and 3).

With the above-described arrangement configuration of the exhaust gas purification device 330, the DPF case 331 and the SCR case 332 are arranged, in such an orientation that the longitudinal direction thereof is the front-rear direction, one above the other at the rear of the steering unit 12 arranged above the engine 11 on the inner side, i.e., the right side, of the threshing unit 6 in the left-right direction.

The DPF case 331 has a diesel particulate filter therein to remove a particulate matter in exhaust gas from the engine 11. The SCR case 332 removes nitrogen oxide in exhaust gas from the engine 11 as a selective catalytic reduction (SCR) system using urea therein.

One end side (upstream side) of an exhaust pipe 341 that introduces exhaust gas from the engine 11 into the DPF case 331 is communicably connected to the exhaust gas outlet side of the supercharger 340. The other end side (downstream side) of the exhaust pipe 341 is communicably connected to an exhaust gas introduction port provided on the lower side of a front portion of the DPF case 331.

A DPF outlet pipe 342 that discharges exhaust gas from the DPF case 331 extends from a rear portion of the DPF case 331. The DPF outlet pipe 342 is arranged in a folded shape so as to extend to the front side after having extended to the left upper side from the rear portion of the DPF case 331. The downstream side of an elbow-shaped SCR inlet pipe 343 arranged so as to extend to the rear side is communicably connected to the exhaust gas introduction port provided on the lower left side of a front portion of the SCR case 332.

The downstream side of the DPF outlet pipe 342 and the upstream side of the SCR inlet pipe 343 face each other in the front-rear direction, and a urea mixing pipe (not shown) communicably connecting these pipes to each other is provided between the DPF outlet pipe 342 and the SCR inlet pipe 343. Exhaust gas discharged to the rear side from the DPF case 331 is returned to the front side by the DPF outlet pipe 342, and is introduced into the SCR case 332 via the urea mixing pipe and the SCR inlet pipe 343.

The DPF outlet pipe 342 is provided with a urea injection portion 348. A urea aqueous solution stored in a urea aqueous solution tank is sprayed and supplied to the urea injection portion 348 by a urea aqueous solution supply device, and is mixed as ammonia with exhaust gas discharged from the DPF case 331 and introduced into the SCR case 332.

An SCR outlet pipe 346 that discharges exhaust gas from the SCR case 332 is provided on the rear side of the SCR case 332. A tail pipe 347 that discharges purified exhaust gas is attached to the other end side (downstream side) of the SCR outlet pipe 346.

By the exhaust gas purification device 330 configured as described above, exhaust gas discharged from the engine 11 is discharged in a purified state in which a particulate matter and nitrogen oxide are removed from the exhaust gas.

Next, the configurations of the exhaust gas purification device 330 on the traveling machine body 4 and the support frame 360 and a coupling frame 380 that support the radiator 14 and the intercooler 500 as the cooling devices, and the like will be described.

Figure 13:
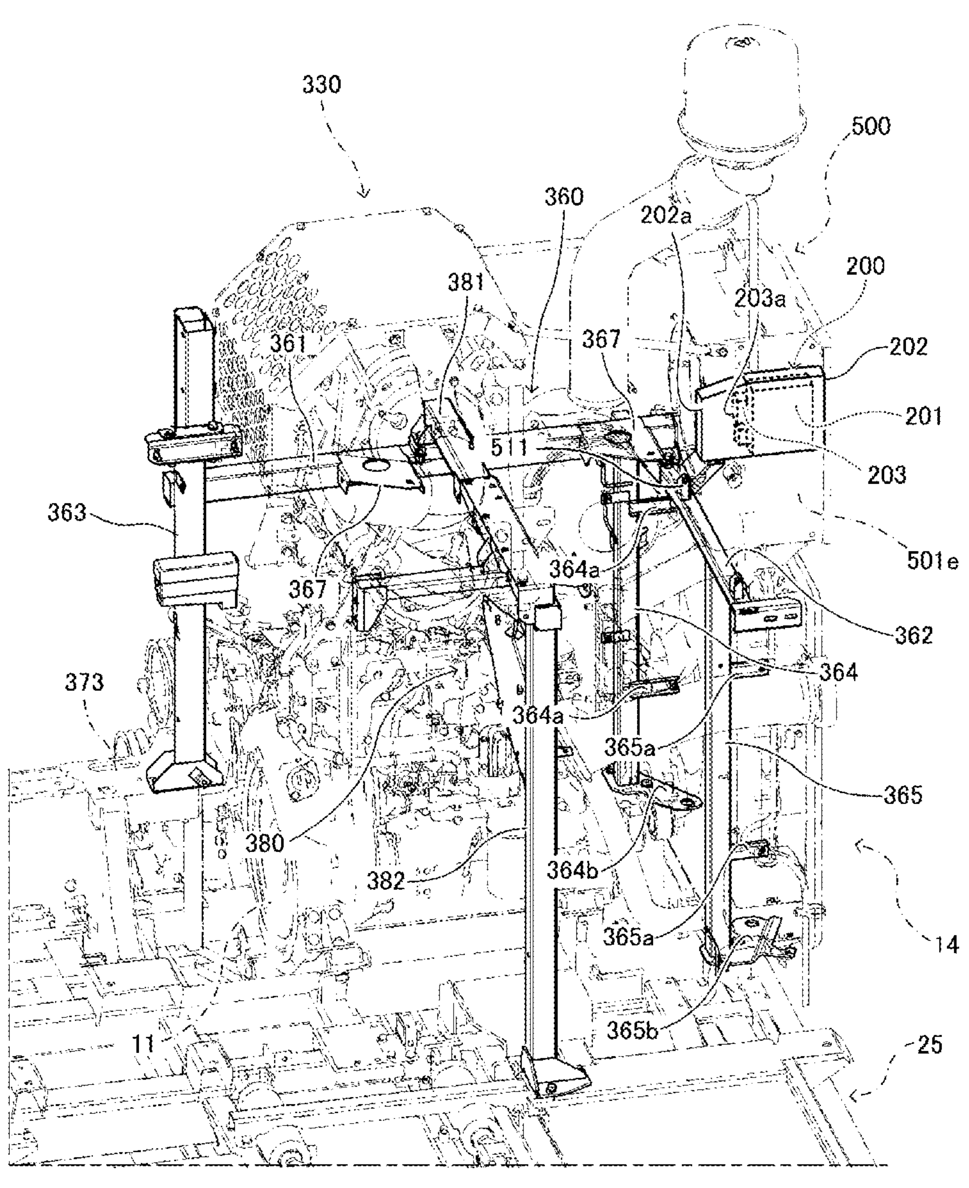
FIG. 13 is a rear perspective view showing the configuration of a support frame and a coupling frame according to one embodiment of the present invention.

As shown in FIG. 13, the support frame 360 and the coupling frame 380 are configured so as to surround the engine 11 placed at the front portion of the machine base 25, and form the engine room 13.

The exhaust gas purification device 330 is supported on the machine base 25 by the support frame 360 and the coupling frame 380. The support frame 360 is a frame provided on the machine base 25 of the traveling machine body 4 to support the steering unit 12. The coupling frame 380 is a frame coupling the support frame 360 to the machine base 25 of the traveling machine body 4.

The support frame 360 includes the front horizontal frame 361 arranged in the left-right direction above the front portion of the engine 11, a front-rear extending frame 362 arranged in the front-rear direction at the right of the engine 11 at the substantially same height position as that of the front horizontal frame 361, and three struts of a front left strut 363, a front right strut 364, and a rear right strut 365.

The front left strut 363 stands on a support base portion 373 provided at a position at the left of the engine 11 on the machine base 25. The support base portion 373 has such a configuration that a horizontal support portion 373*c* is supported by, e.g., a strut 373*a* and a support base 373*b* standing on the machine base 25. The front left strut 363 vertically stands on the support portion 373*c* with a lower end portion of the front left strut 363 fixed to the support portion 373*c* with, e.g., a bolt.

The front right strut 364 is positioned at the front of the front left strut 363 in the front-rear direction, and stands on the machine base 25 at a position on the right front side of the engine 11. The rear right strut 365 is at the substantially same position in the left-right direction as that of the front right strut 364, is positioned at the rear of the front right strut 364, and stands on the machine base 25 at a position on the right rear side of the engine 11.

The front-rear extending frame 362 extends along the front-rear direction in a plan view, and is supported on both the front and rear sides by the front right strut 364 and the rear right strut 365. The upper end sides of the front right strut 364 and the rear right strut 365 are fixed to the front-rear extending frame 362 by, e.g., welding.

The front horizontal frame 361 is horizontally installed between the front left strut 363 and the front-rear extending frame 362. A left end portion of the front horizontal frame 361 is fixed to the front surface of an intermediate portion of the front left strut 363 in the up-down direction by, e.g., welding. A right end portion of the front horizontal frame 361 is positioned on the upper side of a front portion of the front-rear extending frame 362, and is fixedly supported by the front-rear extending frame 362 via, e.g., a predetermined support fitting.

The front horizontal frame 361 is a frame supporting the rear portion of the cabin 30 from below. Provided on both the left and right sides of the front horizontal frame 361 are stands 367 which are horizontal plate-shaped portions protruding rearward from the front horizontal frame 361. The stand 367 is a portion that receives a support leg (not shown) provided at a rear portion of a bottom portion of the cabin 30.

The cabin 30 is supported by the front horizontal frame 361 with the support legs contacting the left and right stands 367 from above. With the above-described configuration, the steering unit 12 provided in the cabin 30 is supported by the support frame 360 provided on the machine base 25.

The coupling frame 380 includes a center front-rear extending frame 381 arranged in the front-rear direction above the engine 11 and a rear central strut 382 provided at the rear of the engine 11. Each of the center front-rear extending frame 381 and the rear central strut 382 is formed of a square steel pipe.

The rear central strut 382 stands at a position at the rear of a center portion of the engine 11 in the left-right direction on the machine base 25. The rear central strut 382 is provided at a substantially center position between the front left strut 363 and the front right strut 364 in the left-right direction, and is provided at a position at the rear with respect to the rear right strut 365 in the front-rear direction.

The center front-rear extending frame 381 horizontally extends along the front-rear direction, and is supported at both the front and rear ends by the front horizontal frame 361 and the rear central strut 382. A front end portion of the center front-rear extending frame 381 is positioned on the upper side of a substantially center portion of the front horizontal frame 361 in the left-right direction, and is fixedly supported via, e.g., a support fitting. A rear end portion of the center front-rear extending frame 381 is supported by the rear central strut 382 from below.

As described above, the center front-rear extending frame 381 and the rear central strut 382 forming the coupling frame 380 form an L-shaped frame portion having one end side coupled and supported by the front horizontal frame 361 and the other end side supported on the machine base 25. A support frame body 390 is provided on the center front-rear extending frame 381 of the coupling frame 380.

The support frame body 390 is a fixing member that fixedly supports the DPF case 331 and the SCR case 332 on the coupling frame 380. That is, the DPF case 331 and the SCR case 332 are provided on the center front-rear extending frame 381 forming the coupling frame 380 with fixedly supported via the support frame body 390.

The support frame body 390 has a substantially rectangular plate-shaped outer shape, and is fixedly supported by the center front-rear extending frame 381 via a predetermined support member in such an orientation that the plate thickness direction thereof is the left-right direction.

The DPF case 331 and the SCR case 332 are positioned on the threshing unit 6 side, i.e., on the left side with respect to the support frame body 390, and are fixedly supported by the support frame body 390 via, e.g., a predetermined fixing member. The support frame body 390 is, for example, a cast component and has a high rigidity.

The DPF case 331 and the SCR case 332 are covered with a cover support frame 420. The cover support frame 420 has one side fixedly supported on the threshing unit 6 side and the other side fixedly supported by the support frame body 390, and is provided so as to extend over the SCR case 332 in the left-right direction As in the exhaust gas purification device 330, the intercooler 500 as the upper cooling device is provided, with supported by the support frame 360, at a position above the radiator 14 as the lower cooling device.

The intercooler 500 is provided with supported on the front-rear extending frame 362 forming the support frame 360. The intercooler 500 is supported, on both the front and rear sides of the case 501, on the front-rear extending frame 362 in such a manner that support stays 512 provided on the case 501 are fixed to support protruding pieces 511 provided on the front-rear extending frame 362. A support portion 510 including the support protruding pieces 511 and the support stays 512 is formed symmetrically with respect to the front-rear direction.

The support protruding pieces 511 are provided at two locations in the front-rear direction with a clearance larger than the dimension of the case 501 in the front-rear direction in such a manner that bent plate-shaped metal fittings having a substantially U-shape in a plan view are fixed, by, e.g., welding, to the upper surface of the front-rear extending frame 362 in a state in which the metal fittings stand with opening on the left side.

The support stay 512 is an elongated bent plate-shaped member having a substantially L-shaped cross sectional shape, and is fixed to each of a front portion 501*d* and the rear portion 501*e* of the case 501 with the longitudinal direction thereof as the up-down direction. The support stay 512 is provided on the case 501 in a state where an upper fixing portion 512*a* of the support stay 512 is fixed to the front portion 501*d* or the rear portion 501*e* by, e.g., welding and a lower portion of the support stay 512 protrudes downward from the lower portion 501*a*.

As described above, the support stays 512 form legs protruding downward on both the front and rear sides of the case 501, and lower end portions of the legs are fixed to the support protruding pieces 511 protruding from the front-rear extending frame 362.

As shown in FIG. 10, the intercooler 500 is coupled to and supported by the support frame body 390 via two front and rear support rods of a first support rod 521 and a second support rod 522 installed between the intercooler 500 and the support frame body 390 supporting the exhaust gas purification device 330.

Each of the first support rod 521 and the second support rod 522 is a linear pipe-shaped member having a circular cross-sectional shape, and is arranged in the substantially left-right direction so as to extend slightly downward to the right. The first support rod 521 is positioned at the rear with respect to the second support rod 522.

One end portion of the first support rod 521 positioned on the left side is fixed to a predetermined fixing portion provided at an intermediate portion of an upper edge portion of the support frame body 390 in the front-rear direction with, e.g., a bolt. The other end portion of the first support rod 521 positioned on the right side is fixed to the upper left corner of the rear portion 501*e* of the case 501 with, e.g., a bolt.

One end portion of the second support rod 522 positioned on the left side is fixed to a predetermined fixing portion provided at a rear end portion of the upper edge portion of the support frame body 390 with, e.g., a bolt. The other end portion of the second support rod 522 positioned on the right side is fixed to an elongated support stay 529 fixed to the upper left corner of the front portion 501*d* of the case 501 with, e.g., a bolt.

The radiator 14 is arranged at a position below the intercooler 500 supported by the front-rear extending frame 362 as described above. As shown in FIGS. 11 and 13, the radiator 14 is sandwiched between the front right strut 364 and the rear right strut 365 of the support frame 360, and stands along the right edge of the machine base 25.

Each of the front right strut 364 and the rear right strut 365 has a plurality of front or rear brackets 364*a*, 365*a* that protrude outward with a certain clearance in the up-down direction and face each other. In addition, the front right strut 364 and the rear right strut 365 each have band-shaped front and rear bases 364*b*, 365*b* horizontally protruding outward from the lower edges of the front right strut 364 and the rear right strut 365.

As shown in FIGS. 11 and 13, the radiator 14 is fixed in such a manner that side wall portions, which face the front and rear brackets 364*a*, 365*a*, in the width direction and bottom wall portions placed on the front and rear bases 364*b*, 365*b* are fixed to the front right strut 364 and the rear right strut 365 with fixing members such as bolts.

In this manner, the intercooler 500 as the upper cooling device and the radiator 14 as the lower cooling device are coupled to and supported by the support frame 360 on the traveling machine body 4 in a state in which the intercooler 500 on the upper side is arranged slightly rearward with respect to the radiator 14 on the lower side in the front-rear direction of the traveling machine body 4.

A relative positional relationship between the engine 11 and the intercooler 500 and the radiator 14 as the cooling devices is as follows. The intercooler 500 as the upper cooling device is arranged slightly rearward with respect to the engine 11 in the front-rear direction of the traveling machine body 4 in a plan view. That is, the engine 11 is arranged on one side (front side) of the intercooler 500 as the cooling device in the front-rear direction of the traveling machine body 4, and the surface of the intercooler 500 positioned opposite to the one side (front side) is the rear portion 501*e*. The radiator 14 as the lower cooling device has a front-rear length longer than that of the engine 11 in the front-rear direction of the traveling machine body 4 in a plan view, and is arranged at the substantially same position as that of the engine 11.

In other words, the intercooler 500 and the radiator 14 as the cooling devices overlap with the engine 11 in the front-rear direction of the traveling machine body 4. The rear portion 501*e* is one side surface positioned at the rear with respect to the engine 11 and positioned away from the engine 11. The intercooler 500 and the radiator 14 are arranged at the side end portion of the traveling machine body 4.

As described above, on the traveling machine body 4, the intercooler 500 is arranged and supported on the upper side by the support frame 360 and the radiator 14 is arranged and supported below the intercooler 500, so that a space on the machine base 25 can be effectively used and the intercooler 500 and the radiator 14 can be housed in a compact manner.

In the combine 1, a region at the periphery of the intercooler 500 as the upper cooling device and the radiator 14 as the cooling device arranged below the intercooler 500 in proximity thereto is a region where a temperature is relatively stabilized.

That is, in the vicinity of the intercooler 500 and the radiator 14 as the cooling devices, cold air generated by turning drive of the cooling fan 540 and the cooling fan 140 circulates convectively, and a clearance space between the cooling devices and the grain tank 7 is in cooling atmosphere.

Figure 14:
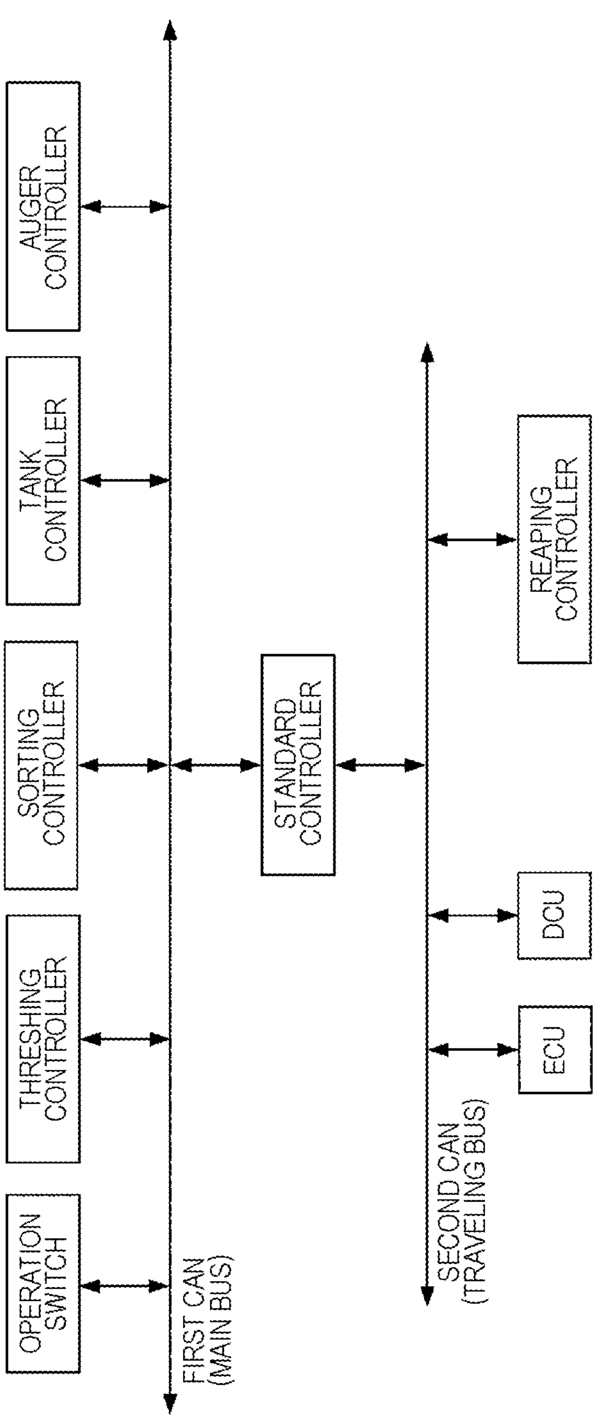
FIG. 14 is a system configuration diagram of an electric controller according to one embodiment of the present invention.

Next, a system configuration of an electric controller that controls operation of the combine 1 will be described. As shown in FIG. 14, a plurality of electric controllers controls each unit included in the combine 1 based on input signals from, e.g., various sensors included in the combine 1.

Each controller has a configuration in which a central processing unit (CPU) as an arithmetic processing device that executes various types of arithmetic processing and control, a storage device such as a random access memory (RAM) or a read only memory (ROM), an input/output device (input/output circuit) such as an input/output interface for data input/output, a peripheral circuit such as a clock circuit, and the like are connected to each other via, e.g., a bus. The CPU of the controller performs arithmetic processing according to various programs stored in, e.g., the ROM.

As shown in FIG. 14, the plurality of electric controllers includes, for example, an engine control unit (ECU) that controls operation of the engine 11, a dosing control unit (DCU) that controls, e.g., the amount of adjustment of urea in the exhaust gas purification device 330, a reaping controller that controls operation of the reaping unit 5, a threshing controller that controls operation of the threshing unit 6, a tank controller that controls harvesting information on the grain tank 7, a sorting controller that controls operation of the sorting unit 8, an auger controller that controls operation of the discharge auger 9, and a standard controller that controls a power source, a work clutch, an alarm, and a hydraulic system. However, the configuration of each controller is not particularly limited.

These electric controllers are communicably connected to each other via a first controller area network (CAN) serving as a main BUS of each device member necessary for harvesting operation and a second CAN serving as a traveling BUS of each device member necessary for traveling operation.

Connected to the first CAN are the threshing controller, the auger controller, the tank controller, the sorting controller, and an operation switch for inputting an operation condition for each device. Connected to the second CAN are the ECU, the DCU, and the reaping controller.

The first CAN and the second CAN are connected to each other via the standard controller. As described above, a parallel BUS including the first CAN of the harvesting operation system and the second CAN of the traveling operation system is communicably connected via each electric controller such that, e.g., synchronization control of the engine 11, the exhaust gas purification device 330, the reaping unit 5, the threshing unit 6, the grain tank 7, the sorting unit 8, and the discharge auger 9 is performed.

Next, the arrangement and configuration of an electric controller 200 in the combine 1 will be described. As shown in FIGS. 10 and 12, the electric controller 200 is arranged on one side surface of the plurality of upper and lower cooling devices. The electric controller 200 of the present embodiment is an ECU that controls operation of the engine 11.

That is, the electric controller 200 is arranged on one side surface of the intercooler 500 as the upper cooling device or the radiator 14 as the lower cooling device, the intercooler 500 and the radiator 14 being coupled to and supported by the support frame 360 standing on the traveling machine body 4.

According to this configuration, the electric controller 200 is not directly arranged on the machine main body (traveling machine body 4), and therefore, vibration caused by drive of the engine 11 is not directly transmitted to the electric controller 200. That is, the vibration of the engine 11 is absorbed by deflection of the support frame 360 and the coupling frame 380 assembled from the front horizontal frame 361, the front-rear extending frame 362, the front left strut 363, and the like and direct vibration transmission to the radiator 14 and the intercooler 500 is reduced, so that damage of the electric controller 200 due to vibration impact can be prevented.

In the electric controller 200, a circuit board as a control center is housed in a board housing case 201 having a rectangular flat outer shape, and the bottom surface of the board housing case 201 is screwed by a fixing member such as a bolt with contacting the upper side (upper half portion) of the rear portion 501*e* of the case 501 forming the intercooler 500.

The electric controller 200 includes female couplers 203 into which male couplers 211 provided at an end portion of a connection cable 210 as a harness for connecting the engine 11 and the electric controller 200 to each other are inserted and fitted.

The female coupler 203 has a quadrangular tubular shape, and has a tip end opening as an insertion port 203*a* that receives the male coupler 211. Two female couplers 203 adjacent to each other protrude from one side wall portion of the board housing case 201 with the tube axis direction of the female coupler 203 being perpendicular to the thickness direction of the board housing case 201.

In a state in which the insertion ports 203*a* of the female couplers 203 face the inside (left side) of the combine 1, the electric controller 200 is vertically arranged, with the front-rear direction as the plate thickness direction, on the rear portion 501*e* of the intercooler 500.

The electric controller 200 is arranged on the rear portion 501*e* of the intercooler 500 such that the tube axis direction of the female coupler 203 is the same direction as the rotation axis direction (air blowing direction) of the cooling fan 540.

That is, the electric controller 200 reduces a chance of accumulating dust from the outside of the combine 1 on a portion connected to a wiring member, such as a cable or a cord, connected to the engine 11 since the connection portion faces the inside (left side) of the combine 1.

In addition, the electric controller 200 is provided on the rear portion 501*e* of the intercooler 500 in a state in which an outer portion of each female coupler 203 other than the insertion port 203*a* thereof is entirely covered with a cover body 202.

The cover body 202 has an opening 202*a* opening on one side wall side of the electric controller 200 corresponding to the insertion ports 203*a*, and has a substantially rectangular flat box shape along the outer shape of the electric controller 200.

The cover body 202 is integrally fixed to the board housing case 201 by a fixing member such as a bolt in a state in which the electric controller 200 is included in a nested manner in an inner space of the cover body 202.

The cover body 202 has a trapezoidal shape in a side view in which an upper wall is inclined downward from a middle portion toward the opening 202*a*, and the diameter of the opening 202*a* is reduced. The opening 202*a* of the cover body 202 functions as an insertion port through which the connection cable 210 connected to the electric controller 200 inside the cover body 202 passes.

The electric controller 200 is arranged on the rear portion 501*e* of the intercooler 500, and in this state, the female couplers 203 protrude to the engine side with respect to the left portion 501*c* of the intercooler 500. The insertion port 203*a* of the female coupler 203 is arranged so as to face the inside of the combine 1, i.e., the inside in the width direction of the traveling machine body 4, with respect to the intercooler 500.

That is, the couplers of the electric controller 200 are attached sideways on the inner side of the traveling machine body 4. According to this configuration, it is easy to arrange the electric controller 200 along the side portion of the case 501, such as the rear portion 501*e* of the intercooler 500, and workability is improved.

The cover body 202 covers, from the outside, the female couplers 203 protruding from the left portion 501*c* of the intercooler 500. That is, the cover body 202 is configured to cover, from the outside, a main body portion of the electric controller 200 provided on the intercooler 500 and a connection portion (male couplers 211 of the connection cable 210 and female couplers 203 of the electric controller 200 fitted to each other) between the connection cable 210 and the electric controller 200.

In this manner, the electric controller 200 arranged on one side portion of the intercooler 500 is arranged above and outside (left) the engine 11 and behind the reaping unit 5 on the traveling machine body 4.

That is, in the front-rear direction of the traveling machine body 4, the engine 11 is arranged on one side (front portion 501*d* side) of the intercooler 500 as the cooling device, and the electric controller 200 is arranged on the surface (rear portion 501*e*) of the intercooler 500, which is the cooling device, opposite to the one side (front portion 501*d* side).

According to this configuration, it is possible to keep the electric controller 200 away from the engine 11 which is the core in exhaust heat generation and to prevent the electric controller 200 from being thermally damaged by exhaust heat generated from the engine 11.

Further, the electric controller 200 is arranged with the intercooler 500, the pre-cleaner 562, and the air supply pipe 563 interposed between the electric controller 200 and the engine 11 substantially in the up-down and left-right directions. As shown in FIG. 2, the electric controller 200 is arranged with the intercooler 500 and the cabin 30 interposed between the electric controller 200 and the reaping unit 5 in the front-rear direction. The electric controller 200 is arranged such that the outside air introduction cover 15 is interposed between the electric controller 200 and the outside in the left-right direction and the electric controller 200 and the intercooler 500 are together covered with the outside air introduction cover 15. Further, the electric controller 200 is arranged between the cooling device and the grain tank 7.

As described above, while kept away from the engine 11 and the reaping unit 5, the electric controller 200 is shielded from heat generated from the engine 11 and dust caused by reaping by the reaping unit 5 by various functional members interposed therebetween.

In particular, the region at the periphery of the intercooler 500 and the radiator 14 arranged one above the other as the cooling devices is the region where the cooling fan 540 and the cooling fan 140 operate and the temperature is relatively stable, and there is no possibility that an unnecessary exhaust heat load from the engine is applied to the electric controller 200.

In addition, since the vicinity of the right side of the plurality of cooling devices is covered with the outside air introduction cover 15, the electric controller 200 and the cooling devices are together covered and shielded from the outside, and therefore, accumulation of dust on the connection portion between the electric controller 200 and the connection cable 210, i.e., outside the female couplers 203 and the male couplers 211.

Further, since the electric controller 200 is arranged between the cooling device and the grain tank 7, the cooling atmosphere in the clearance space between the cooling device and the grain tank 7 can be utilized.

That is, in the clearance space between the cooling device and the grain tank 7, cold air is generated by the cooling fan 140 and the cooling fan 540. Dust is blown off from the connection portion between the connection cable 210 and the electric controller 200 by the cold air to prevent dust accumulation, and air circulates around the electric controller 200 to cool the electric controller 200.

As described above, the layout configuration of the electric controller 200 which is a precision instrument sensitive to handling is improved, and therefore, it is possible to achieve stable combine control while reducing occurrence of a trouble in control of the harvesting operation system and the traveling operation system and extending the life of the electric controller itself.

Note that the electric controller 200 can be arranged on one side surface of the radiator 14 as the lower cooling device. For example, as shown in FIG. 11, the electric controller 200 can also be vertically arranged on a rear portion 14*a* of the radiator frame 143 of the radiator 14 immediately above the reservoir tank 147. The arrangement position on the cooling device may be the front portion 501*d*, the left portion 501*c*, an upper portion 501*b*, or the lower portion 501*a* other than the rear portion 501*e*.

By improvement in the layout of the electric controller 200 as described above, the stable temperature environment and clean environment achieved by the cooling fan 540 and the radiator 14 as the cooling devices are utilized to reduce occurrence of a trouble due to heat from and dust on the electric controller 200 even though the electric controller 200 is arranged closer to the engine 11 as compared to other locations.

Figure 15:
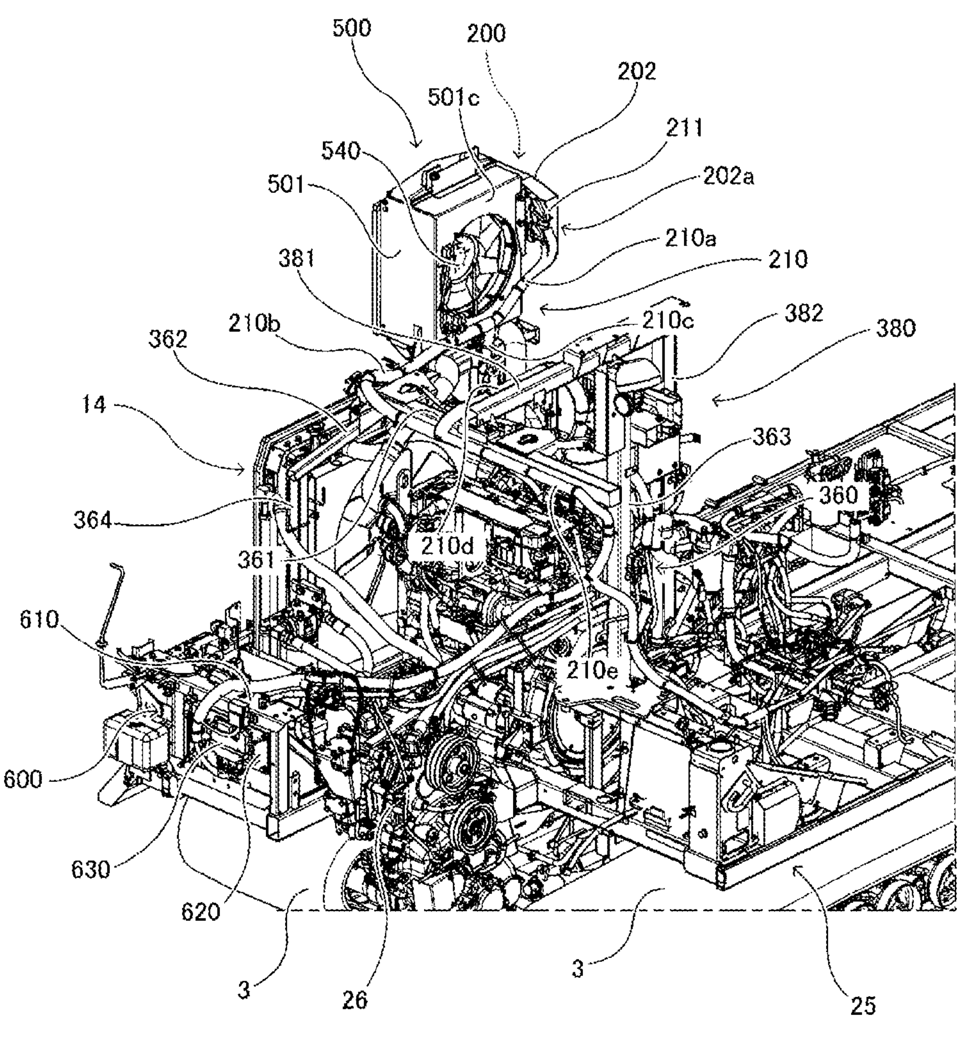
FIG. 15 is a left front perspective view showing a harness wiring configuration according to one embodiment of the present invention.
Figure 16:
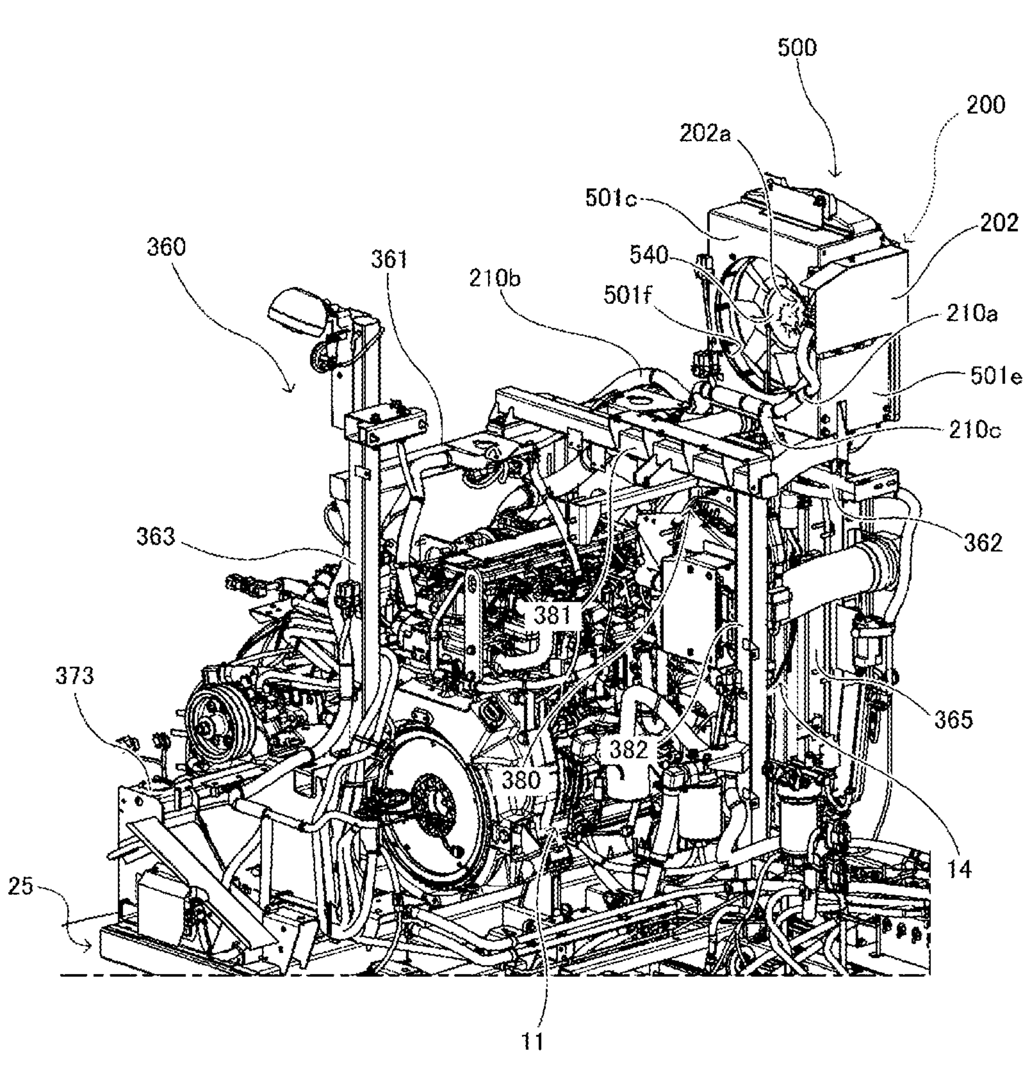
FIG. 16 is a left rear perspective view showing the harness wiring configuration according to one embodiment of the present invention.

The connection cable 210 as the harness that connects, e.g., the electric controller 200 and the engine 11 to each other has heat resistance and insulation properties, and is installed and supported along the support frame 360 and the coupling frame 380 as shown in FIGS. 15 and 16. The connection cable 210 is connected to the electric controller 200 at one end and is branched into a plurality of portions in the middle, and at the other end, the plurality of branched portions is connected to the engine 11 and other members.

The connection cable 210 extends downward from the electric controller 200 along a rear left edge portion of the case 501 of the intercooler 500, is folded back toward the front side to contact the left portion 501*c* of the intercooler 500, and is supported while extending obliquely along the outer edge of the ventilation port 501*f*.

That is, the connection cable 210 includes a base-end-side first cable portion 210*a* extending along the case 501 of the intercooler 500 while bypassing the ventilation port 501*f* therebelow.

The tip end of the first cable portion 210*a* of the connection cable 210 is bifurcated at a position below the rotary shaft of the cooling fan 540 and above the rear right strut 365. That is, the tip end of the first cable portion 210*a* is branched into a second cable portion 210*b* extending forward and a third cable portion 210*c* extending downward.

The second cable portion 210*b* is supported while extending along the front-rear extending frame 362 of the support frame 360, is folded back in the left direction, and is supported while extending along the frame 361 on the front side of the front horizontal frame 361.

The second cable portion 210*b* is bifurcated at the connection portion between the front horizontal frame 361 and the center front-rear extending frame 381. That is, the tip end of the second cable portion 210*b* is branched into a fourth cable portion 210*d* extending rearward along the center front-rear extending frame 381 of the coupling frame 380 and a fifth cable portion 210*e* extending leftward along the front horizontal frame 361 of the support frame 360. The third cable portion 210*c* is supported while extending downward along the rear right strut 365.

In this manner, the connection cable 210 extending while bypassing each member so as to be orderly stretched along the support frame 360 and the coupling frame 380 is connected to the engine 11, other operation members such as the reaping unit 5 and the threshing unit 6, the controller that controls these operation members, and the like That is, with the layout of the electric controller 200 on the cooling device, the connection cable 210 connected to the electric controller 200 is orderly supported and arranged along the support frame 360, so that compact wiring of the harness can be achieved while the harness bypasses each member around the engine 11 where the members are densely packed.

According to the combine 1 of the present embodiment having the above-described configuration, the electric controller 200 that controls operation of the combine 1 is arranged at the location where the electric controller 200 is less susceptible to heat generated from the engine 11 and dust and the like are less likely to be accumulated. Thus, it is possible to prevent occurrence of a trouble in the controller 200 and to make the machine body compact.

The above-described embodiment is one example of the present invention, and the present invention is not limited to the above-described embodiment. Thus, it is a matter of course that various changes can be made according to the design and the like without departing from the technical idea of the present invention even in a case other than the above-described embodiment. Further, the effects described in the present disclosure are merely examples and are not limited, and other effects may be provided.

Note that the present technique can have the following configurations (1) to (7).

(1)

A combine in which an engine is arranged at a front portion of a traveling machine body, including a cooling device that cools the engine, an electric controller that controls operation of the combine being arranged on one side surface of the cooling device.

(2)

The combine according to (1), in which the cooling device is arranged at a side end portion of the traveling machine body, the engine is arranged on one side of the cooling device in the front-rear direction of the traveling machine body, and the electric controller is arranged on a side surface of the cooling device opposite to the one side.

(3)

The combine according (2), in which the cooling device includes a plurality of cooling devices arranged in an up-down direction on the traveling machine body, the electric controller is arranged on an upper one of the plurality of cooling devices, and the upper cooling device includes a cooling fan, and cools air supplied to the engine.

(4)

The combine according to (1) or (2), further including a grain tank on the traveling machine body, the electric controller being arranged between the cooling device and the grain tank.

(5)

The combine according to any one of (1) to (3), in which the electric controller is a controller that controls the engine.

(6)

The combine according to any one of (2) to (5), in which the electric controller includes a coupler to which an end portion of a harness is connected, and the coupler has an insertion port facing the inside of the traveling machine body in the width direction thereof.

(7)

The combine according to any one of (2) to (6), in which the cooling device is coupled to and supported by a support frame standing on the traveling machine body.

LIST OF REFERENCE SIGNS

1 Combine
4 Traveling Machine Body
7 Grain Tank
11 Engine
14 Radiator (Lower Cooling Device)
14*a* Rear Portion (One Side Surface)
140 Cooling Fan
200 Electric Controller
203 Female Coupler
203*a* Insertion Port
210 Connection Cable (Harness)
500 Intercooler (Upper Cooling Device)
501*e* Rear Portion (One Side Surface)
540 Cooling Fan

The invention claimed is:

1. A combine in which an engine is arranged at a front portion of a traveling machine body, the combine comprising:

a cooling device configured to cool the engine, wherein:

the engine is arranged at a front side of the cooling device in a front-rear direction of the traveling machine body, an electric controller configured to control operation of the combine is directly attached to a rear side of the cooling device in the front-rear direction, and the cooling device overlaps the engine along a front-rear direction of the traveling machine body and is arranged at a side portion of the traveling machine body.

2. The combine according to claim 1, wherein:

the cooling device includes a plurality of cooling devices arranged in an up-down direction on the traveling machine body, the electric controller is arranged on an upper one of the plurality of cooling devices, and an upper cooling device of the plurality of cooling devices includes a cooling fan, and the upper cooling device is configured to cool air supplied to the engine.

3. The combine according to claim 2, further comprising:

a grain tank on the traveling machine body, wherein the electric controller is arranged between the cooling device and the grain tank.

4. The combine according to claim 3, wherein the electric controller is a controller that is configured to control the engine.

5. The combine according to claim 1, wherein:

the electric controller includes a coupler to which an end portion of a harness is connected, and the coupler has an insertion port facing an inside of the traveling machine body in a width direction thereof.

6. The combine according to claim 1, wherein the cooling device is coupled to and supported by a support frame standing on the traveling machine body.

7. The combine according to claim 1, wherein the electric controller and the cooling device are covered with an outside air introduction cover.

8. The combine according to claim 1, wherein a line that is perpendicular to the front-rear direction extends through both the cooling device and the engine.

* * * * *